(12) United States Patent
Lee et al.

(10) Patent No.: US 12,046,115 B2
(45) Date of Patent: Jul. 23, 2024

(54) SAFETY SERVICE SYSTEM AND METHOD THEREOF

(71) Applicant: THINKWARE CORPORATION, Seongnam-si (KR)

(72) Inventors: Ji Young Lee, Seoul (KR); Yong Rae Jo, Seoul (KR); Jung Hwa Yoo, Seoul (KR); Ji Hyun Yoo, Seoul (KR); Taekyu Han, Seongnam-si (KR)

(73) Assignee: THINKWARE CORPORATION, Seongnam-si (KR)

( * ) Notice: Subject to any disclaimer, the term of this patent is extended or adjusted under 35 U.S.C. 154(b) by 15 days.

(21) Appl. No.: 17/988,227

(22) Filed: Nov. 16, 2022

(65) Prior Publication Data

US 2023/0090574 A1 Mar. 23, 2023

Related U.S. Application Data

(63) Continuation of application No. 17/060,824, filed on Oct. 1, 2020, now Pat. No. 11,532,222, which is a
(Continued)

(30) Foreign Application Priority Data

Jun. 22, 2011 (KR) ........................ 10-2011-0060612

(51) Int. Cl.
*G08B 21/02* (2006.01)
*H04W 4/029* (2018.01)

(52) U.S. Cl.
CPC ..... *G08B 21/0272* (2013.01); *G08B 21/0269* (2013.01); *G08B 21/0283* (2013.01); *G08B 21/0294* (2013.01); *H04W 4/029* (2018.02)

(58) Field of Classification Search
CPC ............ G08B 21/0272; G08B 21/0269; G08B 21/0283; G08B 21/0294; G08B 21/0205;
(Continued)

(56) References Cited

U.S. PATENT DOCUMENTS 5,835,376 A 11/1998 Smith et al.
6,243,039 B1 6/2001 Elliot
(Continued)

FOREIGN PATENT DOCUMENTS

EP 2700063 B1 6/2015
KR 10-2005-0094580 A 9/2005
(Continued)

OTHER PUBLICATIONS

International Search Report in International Application No. PCT/KR2012/001976, filed Mar. 20, 2012, along with its English translation.
(Continued)

*Primary Examiner* — James J Yang
(74) *Attorney, Agent, or Firm* — WHDA, LLP

(57) ABSTRACT

Disclosed are a safety service system and a method thereof. The safety service system comprises: a collection unit for collecting position information and image information related to a protected person who is registered by a protector; and a service providing unit for providing the position information and the image information to one or both of the protector and a security company upon detection of a signal that the protected person is in danger.

20 Claims, 33 Drawing Sheets

Related U.S. Application Data continuation of application No. 16/696,552, filed on Nov. 26, 2019, now Pat. No. 11,017,650, which is a continuation of application No. 15/959,999, filed on Apr. 23, 2018, now Pat. No. 10,510,237, which is a continuation of application No. 14/957,266, filed on Dec. 2, 2015, now Pat. No. 9,978,241, which is a continuation of application No. 14/128,976, filed as application No. PCT/KR2012/001976 on Mar. 20, 2012, now Pat. No. 9,224,282.

(58) Field of Classification Search
CPC ............ G08B 21/0255; G08B 21/0261; G08B 25/016; H04W 4/029; H04W 4/02; G01S 19/17; G06Q 50/10
See application file for complete search history.

(56) References Cited

U.S. PATENT DOCUMENTS

| | | |
|---|---|---|
| 6,756,913 B1 | 6/2004 | Ayed |
| 7,080,139 B1 | 7/2006 | Briggs et al. |
| 7,113,864 B2 | 9/2006 | Smith et al. |
| 7,146,270 B2 | 12/2006 | Nozaki et al. |
| 7,257,420 B2 | 8/2007 | Inaba et al. |
| 7,298,256 B2 | 11/2007 | Sato et al. |
| 7,349,708 B2 | 3/2008 | Lee et al. |
| 7,479,899 B2 | 1/2009 | Horstemeyer |
| 7,499,528 B2 | 3/2009 | Lee et al. |
| 7,499,714 B2 | 3/2009 | Ki |
| 7,555,386 B2 | 6/2009 | Song |
| 7,627,422 B2 | 12/2009 | Adamczyk et al. |
| 7,664,233 B1 | 2/2010 | Kirchmeier et al. |
| 7,840,427 B2 | 11/2010 | O'Sullivan |
| 7,899,616 B2 | 3/2011 | Breed |
| 7,930,098 B2 | 4/2011 | Huang et al. |
| 7,953,618 B2 | 5/2011 | Pearce et al. |
| 8,086,400 B2 | 12/2011 | Huang et al. |
| 8,126,903 B2 | 2/2012 | Lehmann et al. |
| 8,131,307 B2 | 3/2012 | Lubeck et al. |
| 8,209,118 B2 | 6/2012 | Chang et al. |
| 8,219,467 B2 | 7/2012 | Kosseifi et al. |
| 8,260,547 B2 | 9/2012 | Geelen et al. |
| 8,285,611 B2 | 10/2012 | Fuller et al. |
| 8,311,560 B2 | 11/2012 | Kong |
| 8,312,380 B2 | 11/2012 | Churchill et al. |
| 8,447,331 B2 | 5/2013 | Busch |
| 8,509,987 B2 | 8/2013 | Resner |
| 8,543,335 B2 | 9/2013 | Gruijters et al. |
| 8,554,608 B1 | 10/2013 | O'Connor |
| 8,565,804 B2 | 10/2013 | Roberts, Sr. et al. |
| 8,583,317 B2 | 11/2013 | Nishida |
| 8,600,668 B2 | 12/2013 | Geelen et al. |
| 8,649,803 B1 | 2/2014 | Hamill |
| 8,670,781 B2 | 3/2014 | Kim et al. |
| 8,670,785 B2 | 3/2014 | Nam |
| 8,688,378 B2 | 4/2014 | McCall et al. |
| 8,744,745 B2 | 6/2014 | Pudar et al. |
| 8,838,146 B2 | 9/2014 | Yoon |
| 8,838,157 B2 | 9/2014 | Lee et al. |
| 8,855,909 B2 | 10/2014 | Bauer |
| 8,868,028 B1 | 10/2014 | Kaltsukis |
| 8,880,601 B2 | 11/2014 | Boskovic |
| 9,129,449 B2 | 9/2015 | Davidson |
| 9,224,282 B2 | 12/2015 | Lee et al. |
| 9,261,365 B2 | 2/2016 | Rothschild |
| 9,332,381 B2 | 5/2016 | Yarvis |
| 9,460,410 B2 | 10/2016 | Hill et al. |
| 9,519,921 B2 | 12/2016 | Wei et al. |
| 9,596,359 B2 | 3/2017 | Carlson et al. |
| 9,706,367 B2 | 7/2017 | Tao et al. |
| 9,726,496 B2 | 8/2017 | Rhee et al. |
| 9,892,637 B2 | 2/2018 | Demisse |
| 9,933,270 B2 | 4/2018 | Scalisi et al. |
| 9,933,271 B2 | 4/2018 | Magazinik et al. |
| 9,976,863 B2 | 5/2018 | Dryjanski et al. |
| 10,002,198 B2 | 6/2018 | Felt et al. |
| 10,012,515 B2 | 7/2018 | Wesselius et al. |
| 10,083,608 B2 | 9/2018 | O'Sullivan |
| 10,121,148 B1 | 11/2018 | Kozlowski et al. |
| 10,169,987 B1 | 1/2019 | Demisse |
| 10,181,104 B2 | 1/2019 | Haque |
| 10,242,372 B2 | 3/2019 | Sullivan et al. |
| 10,249,184 B2 | 4/2019 | Demisse et al. |
| 10,362,444 B2 | 7/2019 | Lubeck et al. |
| 10,395,525 B1 | 8/2019 | Demisse |
| 10,467,896 B2 | 11/2019 | Demisse et al. |
| 10,520,325 B2 | 12/2019 | Lewinson et al. |
| 10,529,005 B2 | 1/2020 | Smirin |
| 10,559,199 B1 | 2/2020 | Demisse |
| 10,607,192 B2 | 3/2020 | Abbas et al. |
| 10,636,108 B2 | 4/2020 | Eyler et al. |
| 10,672,265 B2 | 6/2020 | Demisse et al. |
| 10,748,417 B1 | 8/2020 | Demisse |
| 10,789,837 B2 | 9/2020 | Demisse et al. |
| 10,866,110 B2 * | 12/2020 | Kim .................. G08G 1/09685 |
| 11,651,669 B2 | 5/2023 | Slavin et al. |
| 2002/0026289 A1 | 2/2002 | Kuzunuki et al. |
| 2003/0012344 A1 | 1/2003 | Agarwal et al. |
| 2003/0065556 A1 | 4/2003 | Takanashi et al. |
| 2003/0177020 A1 | 9/2003 | Okamura |
| 2003/0177062 A1 | 9/2003 | Chen |
| 2003/0212567 A1 | 11/2003 | Shintani et al. |
| 2004/0176107 A1 | 9/2004 | Chadha |
| 2004/0177109 A1 | 9/2004 | Lee |
| 2004/0181572 A1 | 9/2004 | Lee et al. |
| 2004/0186813 A1 | 9/2004 | Tedesco et al. |
| 2004/0190767 A1 | 9/2004 | Tedesco et al. |
| 2004/0198382 A1 | 10/2004 | Wong |
| 2005/0009536 A1 | 1/2005 | Ito et al. |
| 2005/0025320 A1 | 2/2005 | Barry |
| 2005/0037748 A1 | 2/2005 | Sawano |
| 2005/0091332 A1 | 4/2005 | Moro et al. |
| 2005/0118983 A1 | 6/2005 | Van Camp |
| 2005/0136912 A1 | 6/2005 | Curatolo et al. |
| 2005/0151642 A1 | 7/2005 | Tupler et al. |
| 2005/0264425 A1 | 12/2005 | Sato et al. |
| 2006/0009234 A1 | 1/2006 | Freer |
| 2006/0058953 A1 | 3/2006 | Cooper et al. |
| 2006/0059023 A1 | 3/2006 | Mashinsky |
| 2006/0149466 A1 | 7/2006 | Kikuchi et al. |
| 2006/0155461 A1 | 7/2006 | Cho |
| 2006/0181411 A1 | 8/2006 | Fast et al. |
| 2006/0239545 A1 | 10/2006 | Tedesco et al. |
| 2006/0239546 A1 | 10/2006 | Tedesco et al. |
| 2006/0245622 A1 | 11/2006 | Tedesco et al. |
| 2006/0248027 A1 | 11/2006 | Tedesco et al. |
| 2006/0248028 A1 | 11/2006 | Tedesco et al. |
| 2006/0293937 A1 | 12/2006 | Sohm et al. |
| 2007/0070213 A1 | 3/2007 | Tedesco et al. |
| 2007/0225902 A1 | 9/2007 | Gretton et al. |
| 2007/0229350 A1 | 10/2007 | Scalisi et al. |
| 2007/0243869 A1 * | 10/2007 | Kwon ................ G08B 21/0261 455/435.1 |
| 2007/0247316 A1 | 10/2007 | Wildman et al. |
| 2007/0271257 A1 | 11/2007 | Kari et al. |
| 2008/0020781 A1 | 1/2008 | Cho |
| 2008/0027641 A1 | 1/2008 | Fujiwara |
| 2008/0061962 A1 | 3/2008 | Campman |
| 2008/0090592 A1 | 4/2008 | Tsuchiya |
| 2008/0130854 A1 | 6/2008 | Kim |
| 2008/0167811 A1 | 7/2008 | Geelen |
| 2008/0167813 A1 | 7/2008 | Geelen et al. |
| 2008/0167896 A1 | 7/2008 | Fast et al. |
| 2008/0186166 A1 | 8/2008 | Zhou et al. |
| 2008/0194238 A1 | 8/2008 | Kwon |
| 2009/0030885 A1 | 1/2009 | DePasquale et al. |
| 2009/0067584 A1 | 3/2009 | Waters et al. |
| 2009/0077045 A1 | 3/2009 | Kirchmeier et al. |
| 2009/0098882 A1 | 4/2009 | Yoon |
| 2009/0117921 A1 | 5/2009 | Beydler et al. |
| 2009/0119119 A1 | 5/2009 | Scalisi et al. |
| 2009/0135008 A1 | 5/2009 | Kirchmeier et al. |
| 2009/0172009 A1 | 7/2009 | Schmith et al. |

(56) References Cited

U.S. PATENT DOCUMENTS

| | | |
|---|---|---|
| 2009/0192851 A1 | 7/2009 | Bishop |
| 2009/0270110 A1 | 10/2009 | Ardalan |
| 2009/0286505 A1 | 11/2009 | Kirk |
| 2010/0026495 A1 | 2/2010 | Fast et al. |
| 2010/0029302 A1 | 2/2010 | Lee et al. |
| 2010/0114626 A1 | 5/2010 | Piccinini et al. |
| 2010/0211307 A1 | 8/2010 | Geelen |
| 2010/0241709 A1 | 9/2010 | Roumeliotis et al. |
| 2010/0261486 A1 | 10/2010 | Sheha et al. |
| 2010/0274569 A1 | 10/2010 | Reudink |
| 2010/0295656 A1 | 11/2010 | Herickhoff et al. |
| 2010/0325194 A1 | 12/2010 | Williamson et al. |
| 2011/0046920 A1* | 2/2011 | Amis ............ G08B 27/00 709/217 |
| 2011/0053552 A1* | 3/2011 | Kim ............ G08G 1/005 455/456.2 |
| 2011/0111728 A1* | 5/2011 | Ferguson ............ H04W 4/90 455/404.1 |
| 2011/0117941 A1 | 5/2011 | Zhang |
| 2011/0131243 A1 | 6/2011 | Aben et al. |
| 2011/0137813 A1 | 6/2011 | Stewart |
| 2011/0173023 A1 | 7/2011 | LeClair et al. |
| 2011/0201313 A1 | 8/2011 | McLaughlin |
| 2011/0227726 A1 | 9/2011 | Lee |
| 2011/0313804 A1 | 12/2011 | Camp et al. |
| 2012/0034929 A1 | 2/2012 | Ozer et al. |
| 2012/0041675 A1 | 2/2012 | Juliver et al. |
| 2012/0078671 A1 | 3/2012 | Mohebbi et al. |
| 2012/0109694 A1 | 5/2012 | Lee et al. |
| 2012/0129460 A1 | 5/2012 | Hodis et al. |
| 2012/0130627 A1 | 5/2012 | Islam et al. |
| 2012/0131170 A1 | 5/2012 | Spat |
| 2012/0203599 A1 | 8/2012 | Choi et al. |
| 2012/0238234 A1 | 9/2012 | Duarte |
| 2012/0286944 A1 | 11/2012 | Forutanpour et al. |
| 2012/0303455 A1 | 11/2012 | Busch |
| 2012/0319840 A1 | 12/2012 | Amis |
| 2013/0013381 A1 | 1/2013 | Liu |
| 2013/0023291 A1 | 1/2013 | Pilskalns |
| 2013/0024249 A1 | 1/2013 | Zohar et al. |
| 2013/0073327 A1 | 3/2013 | Edelberg |
| 2013/0078964 A1 | 3/2013 | Jin et al. |
| 2013/0173159 A1 | 7/2013 | Trum et al. |
| 2013/0290040 A1 | 10/2013 | Perry et al. |
| 2013/0332068 A1 | 12/2013 | Kesar et al. |
| 2014/0035726 A1 | 2/2014 | Schoner et al. |
| 2014/0062687 A1 | 3/2014 | Voticky |
| 2014/0232541 A1 | 8/2014 | Trenkle et al. |
| 2015/0046080 A1 | 2/2015 | Wesselius et al. |
| 2015/0161564 A1 | 6/2015 | Sweeney et al. |
| 2015/0172894 A1 | 6/2015 | Gabel |
| 2016/0021154 A1 | 1/2016 | Schoeffler |
| 2016/0027079 A1 | 1/2016 | Schoeffler |
| 2017/0178269 A1 | 6/2017 | McKinnon et al. |
| 2017/0301029 A1 | 10/2017 | Basir |
| 2020/0066153 A1 | 2/2020 | O'Sullivan |
| 2020/0320656 A1 | 10/2020 | Eyler et al. |
| 2021/0397336 A1 | 12/2021 | Matas et al. |

FOREIGN PATENT DOCUMENTS

| | | |
|---|---|---|
| KR | 10-2005-0121458 A | 12/2005 |
| KR | 10-2009-0067558 A | 6/2009 |
| KR | 10-2010-0032586 A | 3/2010 |
| WO | 2005/040847 A2 | 5/2005 |
| WO | 2007/139375 A1 | 12/2007 |
| WO | 2012/167319 A1 | 12/2012 |

OTHER PUBLICATIONS

Non-Final Office Action dated Apr. 29, 2019 in U.S. Appl. No. 15/959,999.
Notice of Allowance dated Aug. 14, 2019 in U.S. Appl. No. 15/959,999.
Non-Final Office Action dated Jul. 27, 2017 in U.S. Appl. No. 14/957,266.
Notice of Allowance dated Jan. 22, 2018, in U.S. Appl. No. 14/957,266.
Non-Final Office Action dated Apr. 29, 2015 in U.S. Appl. No. 14/128,976.
Notice of Allowance dated Aug. 21, 2015 in U.S. Appl. No. 14/128,976.
Notice of Allowance dated Aug. 25, 2021, issued in U.S. Appl. No. 17/060,819. (33 pages).
Non-Final Action dated Sep. 29, 2021, issued in U.S. Appl. No. 17/150,323 (14 pages).
Non-final Office Action dated Apr. 8, 2024, issued in U.S. Appl. No. 17/971,979 (18 pages).
Non-final Office Action dated Apr. 11, 2024, issued in U.S. Appl. No. 18/370,173 (15 pages).
Non-final Office Action dated Apr. 17, 2024, issued in U.S. Appl. No. 18/370,157 (14 pages).
Non-final Office Action dated Apr. 19, 2024, issued in U.S. Appl. No. 18/370,165 (15 pages).
Notice of Allowance dated Feb. 1, 2024, issued in U.S. Appl. No. 17/865,958 (8 pages).
Non-final Office Action dated Jan. 31, 2024, issued in U.S. Appl. No. 17/988,185 (16 pages).
Notice of Allowance dated Jan. 31, 2024, issued in U.S. Appl. No. 17/988,262 (7 pages).

* cited by examiner

SAFETY SERVICE SYSTEM AND METHOD THEREOF

CROSS-REFERENCE TO RELATED APPLICATIONS

This application is a continuation of U.S. application Ser. No. 17/060,824, filed on Oct. 1, 2020, which is a continuation application of U.S. application Ser. No. 16/696,552, filed on Nov. 26, 2019, which is a continuation of U.S. application Ser. No. 15/959,999, filed on Apr. 23, 2018, which is a continuation of U.S. application Ser. No. 14/957,266 filed on Dec. 2, 2015, which is a continuation of U.S. application Ser. No. 14/128,976 filed on Mar. 28, 2014, which is a national-stage application under 35 USC 371 of PCT/KR2012/001976 filed on Mar. 20, 2012, which claims the benefit of priority from Korean Patent Application No. 10-2011-0060612 filed on Jun. 22, 2011, and the contents of the aforementioned applications are incorporated herein by reference in their entirety.

TECHNICAL FIELD

Embodiments of the present invention relate to a safety service that may verify a location of a ward required to be protected and may quickly cope with an emergency situation.

BACKGROUND ART

In terms of mobility and portability on a user side, a mobile communication terminal applied to a wireless communication network system has employed a location tracking function of the mobile communication terminal based on a location information tracking method using an artificial satellite. In the case of using the location tracking function of the mobile communication terminal, a current location and a travel route of a user of the mobile communication terminal may be tracked in real time.

Currently, according to an exponential increase in social/environmental threat factors, a ward, such as a pre-school child, a schoolchild, an aged person, and a physically/mentally challenged person, may require a constant monitoring and protection from a guardian. Accordingly, there is a strong need for constantly monitoring and managing a target to be protected using a location tracking function of a mobile communication terminal.

DETAILED DESCRIPTION OF THE INVENTION

Technical Subject

An aspect of the present invention provides a safety service system and method that may support an environment in which it is possible to constantly monitor and manage a ward in a web environment and also using a mobile application.

An aspect of the present invention also provides a safety service system and method that may more readily verify an emergency situation of a ward and thereby quickly cope with the emergency situation.

An aspect of the present invention also provides a safety service system and method that may transmit a location and an image of a ward to a guardian or a security company in response to an occurrence of a danger to the ward.

An aspect of the present invention also provides a safety service system and method that may transmit a location of a ward to a security company in response to an occurrence of a danger to the ward and may also transmit a description of the ward as well as an image of the ward.

An aspect of the present invention also provides a safety service system and method that may share information between guardians to monitor and manage wards.

Technical Solution

According to an embodiment of the present invention, there is provided a safety service system, including: a collector configured to collect location information and image information associated with a ward with respect to the ward registered by a guardian; and a service provider configured to provide the location information and the image information to at least one of the guardian and a security company in response to an alert signal being detected with respect to the ward.

According to an aspect, the collector may be configured to collect, from a ward terminal that is a communication terminal of the ward, location information indicating a current location of the ward and image information in which a peripheral image of the ward is captured.

According to another aspect, the service provider may be configured to store ward information including at least one set of photo or personal information of the ward input from the guardian via a guardian terminal that is a communication terminal of the guardian and description information of the ward, and to provide the ward information to the security company together with the location information and the image information in response to the alert signal being detected.

According to still another aspect, the service provider may be configured to recognize, as the alert signal, at least one of a case in which an abnormal signal occurs in a ward terminal that is a communication terminal of the ward, a case in which the location information is deviated from a safety zone set by the guardian, and a case in which the location information enters a danger zone set by the guardian.

According to still another aspect, the service provider may be configured to receive and store a memo associated with the location information from the guardian, and to provide the memo to another person based on the location information when the memo is allowed to be disclosed.

According to still another aspect, the service provider may be configured to provide an environment setting function of registering or editing ward information including at least one set of photo or personal information of the ward and description information of the ward through a service screen associated with the guardian.

According to still another aspect, the environment setting function may include a terminal authentication function of authenticating a ward terminal that is the communication terminal of the ward.

According to still another aspect, the environment setting function may include a function of registering collection period information that is time information in which the location information and the image information associated with the ward is allowed to be collected.

According to still another aspect, the environment setting function may include a function of registering a safety zone or a danger zone with respect to the ward.

According to still another aspect, the service provider may be configured to provide a ward location reference function of indicating the location information and the image information in response to a request of the guardian on a service screen associated with the guardian.

According to still another aspect, the ward location reference function may display a map screen on which a current location of the ward is marked on a center of a map based on the location information and the image information, brief information associated with the current location of the ward, and a thumbnail image.

According to still another aspect, the ward location reference function may display a current state of the ward based on whether the ward is located within a safety zone or a danger zone registered by the guardian, or may display the location information and the image information in different information display forms based on the current state.

According to still another aspect, the ward location reference function may include a function of selecting at least one ward from among a plurality of wards, and referring to a location of the selected ward.

According to still another aspect, the ward location reference function may include a function of playing the image information.

According to still another aspect, the ward location reference function may include a function of providing a name search based on a map search.

According to still another aspect, the ward location reference function may include a safety information providing function of providing a map screen on which a current location of the ward is marked on a center of a map, and providing safety information in which a point of interest (POI) included in the map screen is classified into a safe POI or a dangerous POI based on a type of the POI.

According to still another aspect, the ward location reference function may include a route searching function of providing a route guide service using a current location of the guardian as a departure and a current location of the ward as a destination.

According to still another aspect, the ward location reference function may include a location change function of providing a map screen on which a current location of the ward is marked on a center of a map, and changing the current location of the ward with a location selected by the guardian on the map screen.

According to still another aspect, the ward location reference function may include a memo function of registering a memo associated with a current location of the ward with respect to the current location of the ward.

According to still another aspect, the ward location reference function may include a neighbor log function of providing a map screen on which the current location of the ward is marked on a center of a map, and displaying a memo registered by another person having allowed the memo to be disclosed on the map screen.

According to still another aspect, the service provider may be configured to provide an SOS function of reporting to the security company about a danger to the ward.

According to still another aspect, the SOS function may be executed in at least one of a case in which a request of the guardian is present on a service screen indicating a current location of the ward, a case in which an abnormal signal occurs in a ward terminal that is a communication terminal of the ward, a case in which the location information is deviated from a safety zone set by the guardian, and a case in which the location information enters a danger zone set by the guardian.

According to still another aspect, the SOS function may include a reference function of referring to at least one of details of a call reported to the security company in association with the danger to the ward, a current state of the ward processed at the security company, and processing details thereof According to still another aspect, the service provider may be configured to provide a travel route function of displaying a travel route that is a travel trace of the ward based on the location information in response to a request of the guardian on a service screen associated with the guardian.

According to another embodiment of the present invention, there is provided a communication terminal, including: a location calculator configured to calculate a current location of a ward; a camera unit configured to provide a photographing function; and a communication unit configured to transmit location information indicating the current location of the ward and image information captured through a camera to a safety service system for providing a safety service to the ward. Here, the location information and the image information may be transmitted to the safety service system in response to an abnormal signal being detected or a request of the safety service system, and may be provided from the safety service system to at least one of a guardian associated with the ward or a security company.

According to an aspect, the location information and the image information may be provided to the security company together with ward information including at least one set of photo or personal information of the ward, which is input from the guardian and thereby registered to the safety service system, and description information of the ward.

According to another aspect, the image information may include at least one of at least one photo taken at predetermined time intervals and a moving picture taken during a predetermined period of time.

According to still another aspect, the communication terminal may further include an input unit configured to receive an alert signal from the ward. Here, the alert signal may be detected as the abnormal signal.

According to still another aspect, the communication terminal may further include an impact detector configured to detect a level of impact. The impact of which the level exceeds a threshold may be recognized as the abnormal signal.

According to still another aspect, the location calculator may be configured to calculate the current location of the ward using at least one of a measurement method based on a global positioning system (GPS) and a measurement method based on a mobile communication base station.

According to still another embodiment of the present invention, there is provided a communication terminal, including: a communication unit configured to connect to a safety service system for providing a safety service to a ward registered by a guardian; and an interface unit configured to display location information and image information associated with the ward on a service screen provided from the safety service system. Here, the location information and the image information may be collected at the safety service system from a ward terminal that is a communication terminal of the ward, and may be provided to at least one of the guardian and a security company in response to an alert signal being detected at the safety service system with respect to the ward.

According to yet another embodiment of the present invention, there is provided a safety service method, including: collecting location information and image information associated with a ward with respect to the ward registered by a guardian; and providing the location information and the image information to at least one of the guardian and a security company in response to an alert signal being detected with respect to the ward.

Effects of the Invention

According to embodiments of the present invention, an environment in which it is possible to constantly monitor and manage a ward in a web environment and also using a mobile application may be supported and thus, it is possible to more readily verifying an emergency situation of the ward and to quickly cope with the situation.

In addition, by transmitting a location and an image of a ward to a guardian or a security company in response to an occurrence of a danger to the ward, an emergency situation of the ward may be easily verified. Also, by further transmitting a description of the ward in addition to the location of the ward and the image of the ward in response to the occurrence of the danger to the ward, more useful information may be provided.

Also, by sharing information between guardians to monitor and manage wards, it is possible to provide a safety service based on a social network service (SNS).

BRIEF DESCRIPTION OF THE INVENTION

BEST MODE FOR CARRYING OUT THE INVENTION

Hereinafter, embodiments of the present invention are described in detail with reference to the accompanying drawings.

Figure 1:
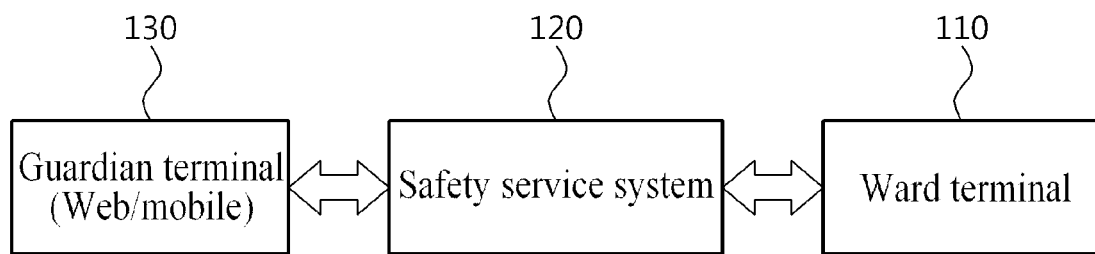
FIG. 1 is a diagram describing a process between a safety service system configured to support monitoring and management of a ward and a guardian/ward terminal according to an embodiment of the present invention.

FIG. 1 is a diagram describing a process between a safety service system and a guardian/ward terminal according to an embodiment of the present invention.

Embodiments of the present invention provide an environment for monitoring and managing a ward. To this end, a safety service system 120 may collect location information of a ward and image information of the ward, such as a photo and a moving picture, from a ward terminal 110. Here, a small terminal embedded with a global positioning system (GPS) and a camera may be used as the ward terminal 110 in order to provide location information and image information from a ward side to the safety service system 120. The safety service system 120 may support a service environment in which a guardian may monitor a current state of the ward without restrictions on a time and an occasion based on the location information and the image information collected from the ward terminal 110. In particular, the safety service system 120 may provide a safety service based on a location based service (LBS). Here, the safety service may be provided in a web/wap service form through a service page on the safety service system 120, or may be provided as a service-only application. The service-only application may include a personal computer (PC) based program or a mobile-only application. That is, the guardian may connect to a service screen, for example, a service page screen or an application execution screen, associated with a safety service using a communication terminal (hereinafter, a guardian terminal) 130 accessible to the safety service system 120, and may monitor an emergency situation of the ward through the service screen. Here, in response to a request of the guardian or an occurrence of a danger to the ward, the safety service system 120 may provide the collected location information and image information to the guardian terminal 130. Further, in response to a request of the guardian or an SOS dispatch request of the ward, the safety service system 120 may transfer location information and image information of the ward to a security company (not shown) and accordingly, a security agent may directly move to a corresponding location and thereby handle and cope with an emergency situation of the ward.

Figure 2:
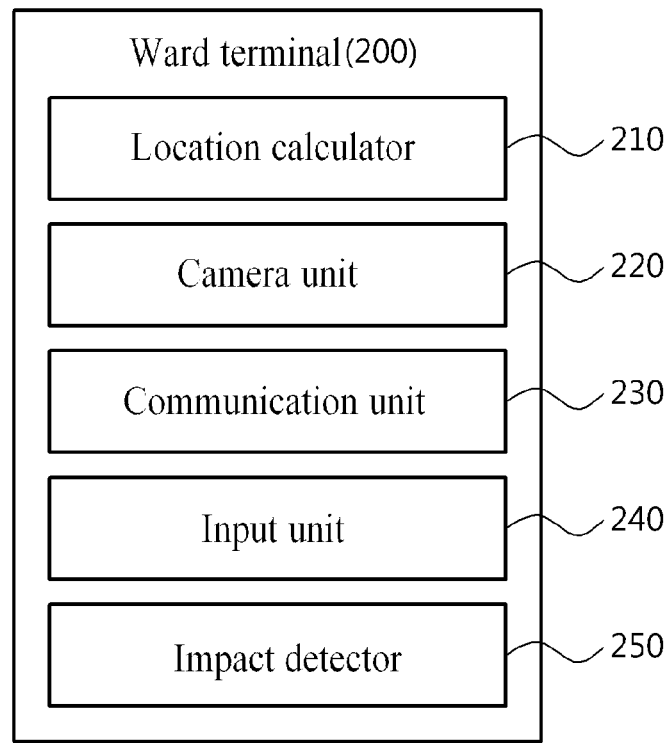
FIG. 2 is a block diagram illustrating an internal configuration of a ward terminal configured to provide a location and an image according to an embodiment of the present invention.

Initially, a configuration and an operation of a ward terminal will be described in detail with reference to FIG. 2. FIG. 2 is a block diagram illustrating a ward terminal 200 configured to provide a location and an image according to an embodiment of the present invention.

Referring to FIG. 2, the ward terminal 200 according to an embodiment may include a location calculator 210, a camera unit 220, a communication unit 230, an input unit 240, and an impact detector 250.

The location calculator 210 may be configured to calculate location information indicating a current location of a ward. Here, the location calculator 210 may calculate the current location of the ward using at least one of a GPS measurement method and a mobile communication base station (that is, a cell base station) measurement method. A location value and information on a measurement method used to calculate a corresponding location may be included in the location information.

The camera unit 210 may provide a function of photographing a focused image. The ward may hold the camera unit 220 to be externally exposed, so that the ward terminal 200 may capture a peripheral image of the ward. The camera unit 220 may photograph a peripheral image of the ward. In this instance, the camera unit 220 may take at least one photo at predetermined time intervals or may take a moving picture during a predetermined period of time based on a setting environment and may use the same as image information of the ward.

The input unit 240 may be configured to receive an alert signal from the ward. In a case in which an emergency situation occurs, the ward may generate the alert signal by manipulating the input unit 240 with the intention of notifying the guardian about the occurrence of the emergency situation.

The impact detector 250 may be configured to detect a level of impact based on an external impact applied to the ward terminal 200. Here, the impact detector 250 may include an impact detection sensor, such as an acceleration sensor, to detect a level of impact applied to the ward terminal 200.

The communication unit 230 may be configured to transmit location information obtained from the location calculator 210 and image information obtained from the camera unit 220 to a safety service system. As an example, in response to a request of the safety service system, the communication unit 230 may transmit location information and image information to the safety service system. As another example, in response to an alert signal input from the ward via the input unit 240, the communication unit 230 may detect the alert signal as an abnormal signal associated with the ward and thereby transmit location information and image information to the safety service system. As another example, when a level of impact detected by the impact detector 250 exceeds a threshold, the communication unit 230 may detect the above impact as an abnormal signal associated with the ward and thereby may transmit location information and image information to the safety service system.

According to the above configuration, the ward terminal 200 may collect location information and image information associated with the ward and may transmit the collected location information and image information to the safety service system in response to an abnormal signal being detected or a request of the safety service system. Here, the location information and the image information may be collected at the safety service system and may be used as information for a safety service. That is, the safety service system may collect location information and image information from the ward terminal 200 and then provide the collected location information and image information to a guardian or a security company.

Figure 3:
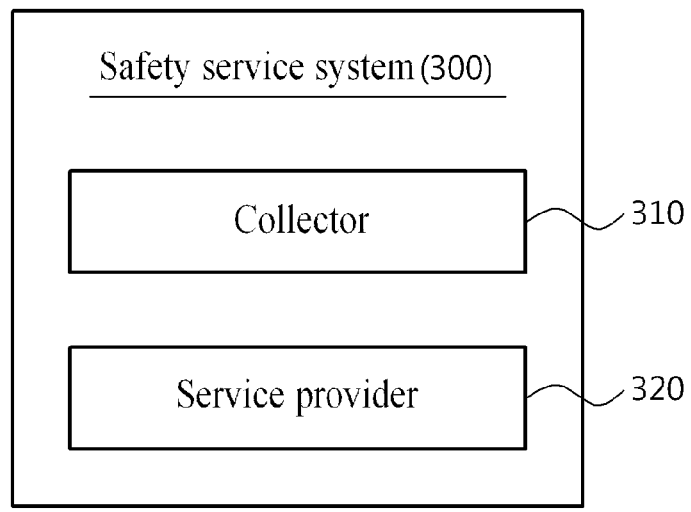
FIG. 3 is a block diagram illustrating an internal configuration of a safety service system configured to provide a safety service with respect to a ward according to an embodiment of the present invention.

Hereinafter, a configuration and an operation of a safety service system will be described in detail with reference to FIG. 3. FIG. 3 is a block diagram illustrating a safety service system 300 configured to provide a safety service with respect to a ward according to an embodiment of the present invention.

Referring to FIG. 3, the safety service system 300 according to an embodiment may include a collector 310 and a service provider 320.

The collector 310 may be configured to collect location information and image information associated with a ward with respect to the ward registered by a guardian. Here, in interaction with a ward terminal, the collector 310 may receive, from the ward terminal as necessary and at predetermined intervals, location information indicating a current location of the ward and image information in which a peripheral image of the ward is captured. The collector 310 may store and maintain the received location information and image information in association with the ward and the guardian. Here, the location information may include information about a location value and a measurement method used to calculate a corresponding location, and the image information may include at least one of at least one photo taken at predetermined time intervals and a moving picture taken during a predetermined period of time.

The service provider 320 may perform a server functionality of managing the overall safety service and thus, may provide an LBS based safety service based on location information and image information of the ward that is collected by the collector 310. The service provider 320 may provide location information and image information of the ward to the guardian in response to a request for referring to the ward from the guardian, and may provide the location information and the image information to the guardian or the security company in response to an alert signal detected with respect to the ward. Here, the service provider 320 may recognize, as the alert signal associated with the ward, at least one of a case in which an abnormal signal occurs in a ward terminal, for example, a case in which the ward directly inputs the alert signal or a case in which an abnormal signal is detected due to a level of impact exceeding a threshold, a case in which the location information is deviated from a safety zone set by the guardian, and a case in which the location information enters a danger zone set by the guardian. The guardian may verify an emergency situation of the ward based on the location information and the image information, and if necessary, may request the security company for an SOS dispatch. Accordingly, the service provider 320 may transfer location information and image information of the ward to the security company and the security company may directly move to a corresponding location and thereby prevent and cope with an emergency situation of the ward. In addition, when ward information, such as a photo, personal information, and description information of the ward, is input from the guardian, the service provider 320 may store and maintain the ward information in a system database (not shown). When transmitting location information and image information of the ward to the security company, the service provider 320 may also provide ward information registered by the guardian. That is, the guardian may frequently register a description of the ward to the safety service system 300 and may provide the registered description to the security company together with a location and an image of the ward in a case in which the ward encounters a danger, in order to be used as useful information for handling the danger to the ward. Also, the service provider 320 may provide a memo function of enabling the guardian to input predetermined comments on a location of the ward. That is, the service provider 320 may receive a memo associated with location information of the ward from the guardian and may store and maintain the received memo in a system database. In addition, the service provider 320 may service a memo of another person to be shared based on location information between guardians having allowed their memos to be disclosed on an SNS. In response to a request of the guardian, the service provider 320 may accumulate location information of the ward and may provide a travel route that is a trace along which the ward has moved. The service provider 320 may provide a service screen associated with a safety service to a guardian terminal connected to the safety service system 300. Here, the service screen may support a function of making a general introduction about the safety service and a function of registering or editing information associated with the guardian and the ward, a function of referring to a location of the ward, a function of requesting an SOS dispatch based on a level of an emergency situation which the ward has encountered, a function of providing a travel route of the ward, a function of sharing information between guardians, an environment setting function of setting an environment of the safety service, and the like. A configuration and each configuration of the service screen will be described in more detail below.

Figure 4:
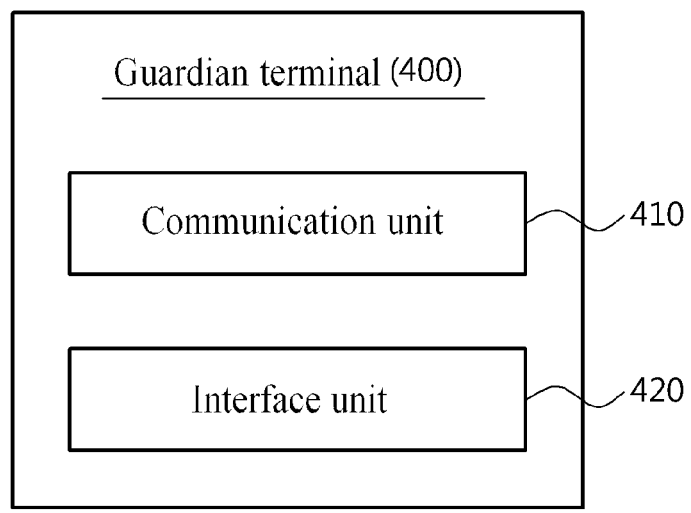
FIG. 4 is a block diagram illustrating an internal configuration of a guardian terminal configured to monitor a ward according to an embodiment of the present invention.

A configuration and an operation of a guardian terminal will be described in detail with reference to FIG. 4. FIG. 4 is a block diagram illustrating a guardian terminal 400 configured to monitor a ward according to an embodiment of the present invention.

Referring to FIG. 4, the guardian terminal 400 according to an embodiment may include a communication unit 410 and an interface unit 420. Here, the guardian terminal 400 may refer to a device configured to connect to a safety service system and thereby monitor an emergency situation of a ward and to call an SOS dispatch signal in response to an occurrence of a danger to the ward. That is, the guardian terminal 400 may refer to any type of wired/wireless communication terminal, such as a PC, a tablet, a smart phone, and a communication navigation device, accessible to the safety service system.

The communication unit 410 may be configured to connect to the safety service system for providing a safety service with respect to a ward registered by a guardian and maintain a connection between the guardian terminal 400 and the safety service system.

The interface unit 420 may refer to an interface device used between the safety service system and the guardian, and may be configured to input required information or to display information provided from the safety service system through a service screen provided from the safety service system. That is, through the service screen associated with the safety service, the interface unit 420 may display a screen for registering or editing information associated with the guardian and the ward, a screen for referring to a location of the ward, a screen for requesting an SOS dispatch based on an emergency situation of the ward, a screen for providing a travel route of the ward, a screen for sharing information between guardians, an environment setting screen for setting an environment of the safety service, and the like.

As described above, only a process for connecting to the safety service system and a user interface (UI) for using the safety service are required for the guardian terminal 400. Processes of registering, referring to, and providing actual information, and a process of managing a database are performed by the safety service system. Service screens displayed on the guardian terminal 400 in association with a safety service provided from the safety service system will be described in detail below. A configuration or a function of each service screen may differ based on an operating system (OS), for example, ANDROID and WinCe, or a usage environment, for example, web/wap and a service-only application, of the guardian terminal 400. In the present embodiment, a web environment and a mobile environment may interact with each other and thus, even though guardians are using different devices, the guardians may use a safety service in heterogeneous environments based on information registered to the safety service system. In the following, service screens are described by employing a service screen through a mobile-only application as an example, however, are not limited to or restricted by the drawings or embodiments of the detailed description. Accordingly, a configuration or a function, a flow, and the like, of a service screen may be variously modified.

Figure 5:
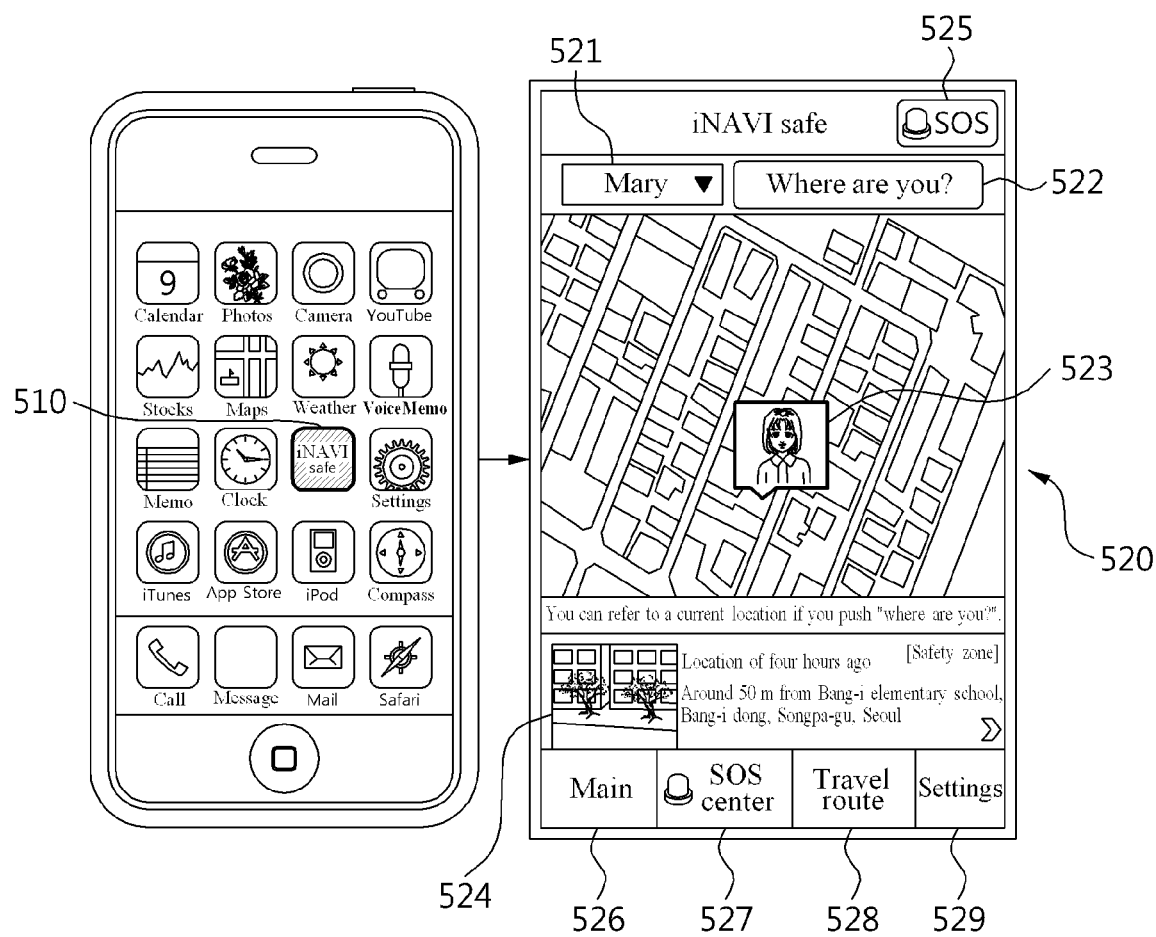
FIG. 5 illustrates an example of an initial menu screen of a safety service according to an embodiment of the present invention.

FIG. 5 illustrates an initial menu screen of a safety service. In response to an application 510 associated with the safety service being executed by a guardian, a guardian terminal may display a service page provided from a safety service system. When an automatic login is not set, a login screen for entering an ID/password (PW) may be preferentially displayed in response to executing the application 510. Meanwhile, in a case in which the guardian is a member registered to the safety service system and an automatic login is set, a main screen 520 of FIG. 5 may be displayed in response to executing the application 510. Here, a latest reference result about a ward basically set by the guardian may be displayed on the main screen 520. As illustrated in FIG. 5, a map screen on which a location of the ward is marked on a center of a map and simple result content, for example, a thumbnail image and location information, about location information and image information of the corresponding ward may be displayed on the main screen 520. Here, a photo of the ward registered by the guardian may be displayed on the map screen at a location of the ward. The main screen 520 may include a footer menu including a menu 521 of selecting a ward, a menu 522 of referring to a location of the selected ward, a menu 523 of registering and editing a description of the selected ward, a menu 524 capable of moving to a detailed page associated with the location of the selected ward, and a menu 525 of requesting an SOS dispatch with respect to the selected ward. A service page associated with the safety service may basically include a main menu 526 of providing a ward location reference page, that is, providing the main screen 520, an SOS center menu 527 of providing a page on which it is possible to call an SOS dispatch signal to an affiliated security company, a travel route menu 528 of providing a page for verifying location information of the ward, received at predetermined intervals, based on a log form on the map or an accumulated time-by-time list, and a setting menu 529 of providing a page on which it is possible to verify a service use state or to input various types of environment settings.

Figure 6:
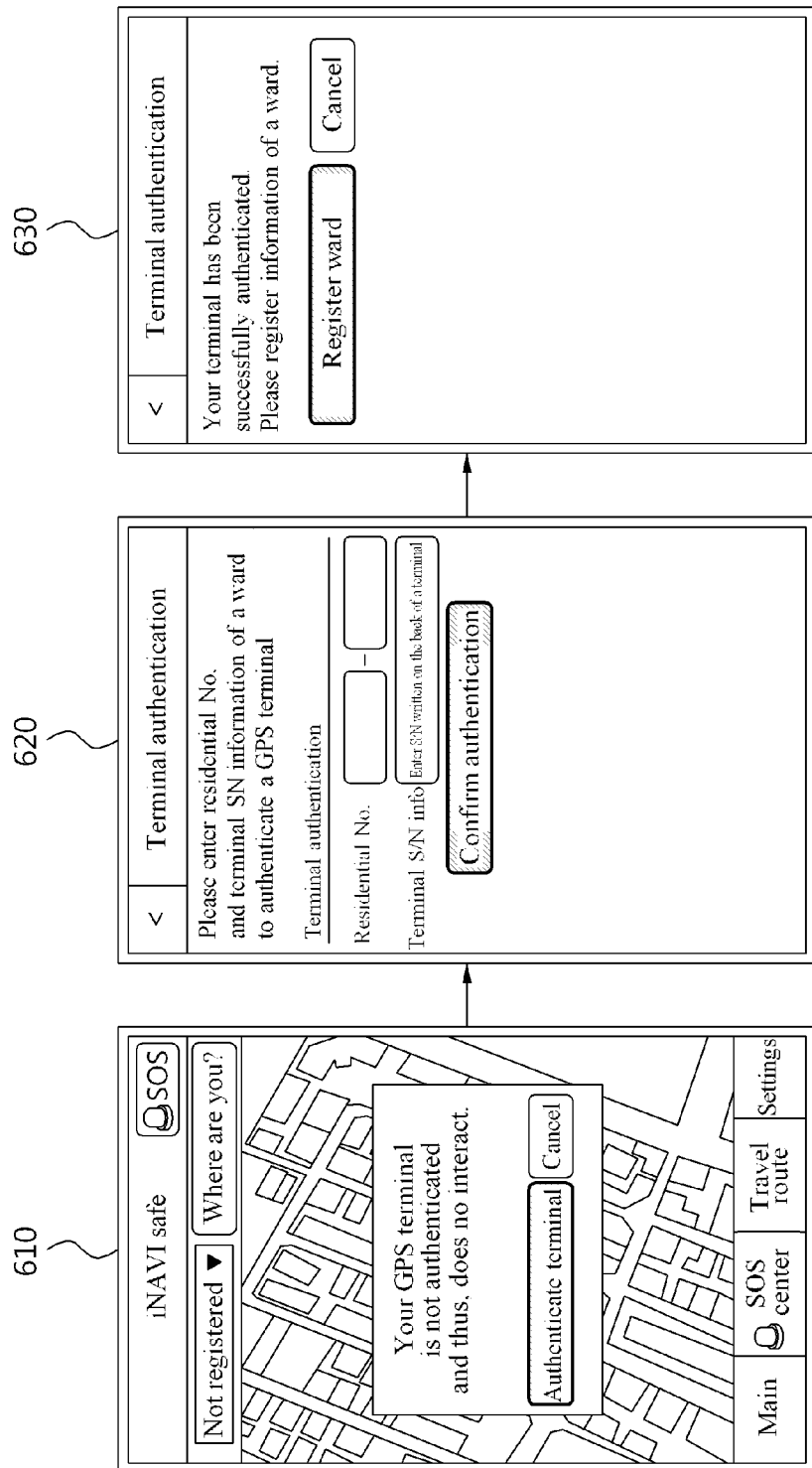
FIGS. 6 and 7 illustrate an example of a service screen associated with a function of authenticating a ward terminal and a function of registering ward information according to an embodiment of the present invention.
Figure 7:
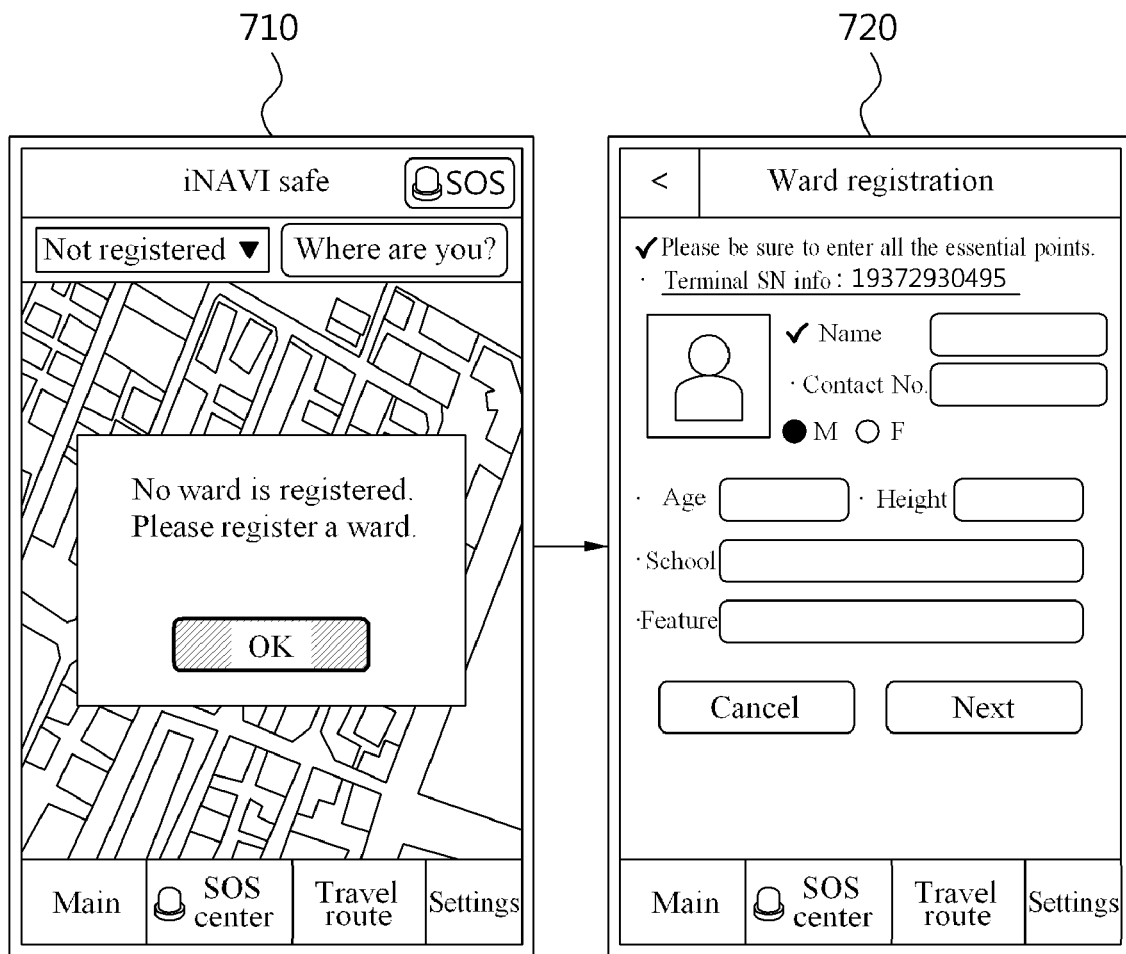

FIGS. 6 and 7 illustrate a service screen associated with a function of authenticating a ward terminal and a function of registering ward information. When executing the application 510, a guardian may be a member registered to a safety service system and may also initially log in the safety service system. In this case, as illustrated in FIG. 6, a popup window 610 may be displayed to perform a terminal authentication procedure for a ward terminal. In response to the guardian tapping "authenticate a terminal" on the popup window 610, the popup window 610 may be switched to a terminal authentication screen 620 for authenticating the ward terminal. Here, a window for entering a residential number of the ward and serial number information of the ward terminal may be displayed on the terminal authentication screen 620. In response to completing the authentication of the ward terminal, the terminal authentication screen 620 may be switched to an authentication result screen 630 for displaying an authentication result. Here, a 'ward registration' menu capable of registering a ward of the authenticated ward terminal may be displayed on the authentication result screen 630. Here, the "ward registration" menu may provide a menu environment of enabling the guardian to register at least one ward. Even though the ward of the ward terminal authenticated in response to executing the application 510 is not registered, a ward registration procedure may be performed through a popup window 710 of FIG. 7. In response to the guardian tapping "okay" on the popup window 710 or tapping the "ward registration" menu on the authentication result screen 630, the popup window 710 may be switched to a ward registration screen 720 for registering a ward. Here, a plurality of wards may be registered on the ward registration screen 720. In particular, a function of registering or editing ward information such as a photo or personal information, for example, a name, a contact number, a sex, an age, a height/weight, and a school, of each ward, a feature, for example, a physical feature or a description of each ward, and a routing period may be provided. Here, the routing period may refer to collection period information that is time information in which location information and image information associated with a ward is allowed to be collected. As described above, in the present embodiment, a ward terminal authentication procedure and a ward registration procedure may need to be initially performed. Also, when the guardian is an associate member, a service introduction page for guiding and introducing the overall safety service may be displayed through a service page.

—Description Registration Function

The description registration function refers to a function that enables a guardian to record detailed ward information, such as a latest photo or clothes of a ward, for example, dress on the way to school. Here, in response to making an SOS dispatch call for the ward, ward information may be provided to a security company together with location information and image information of the ward.

Figure 8:
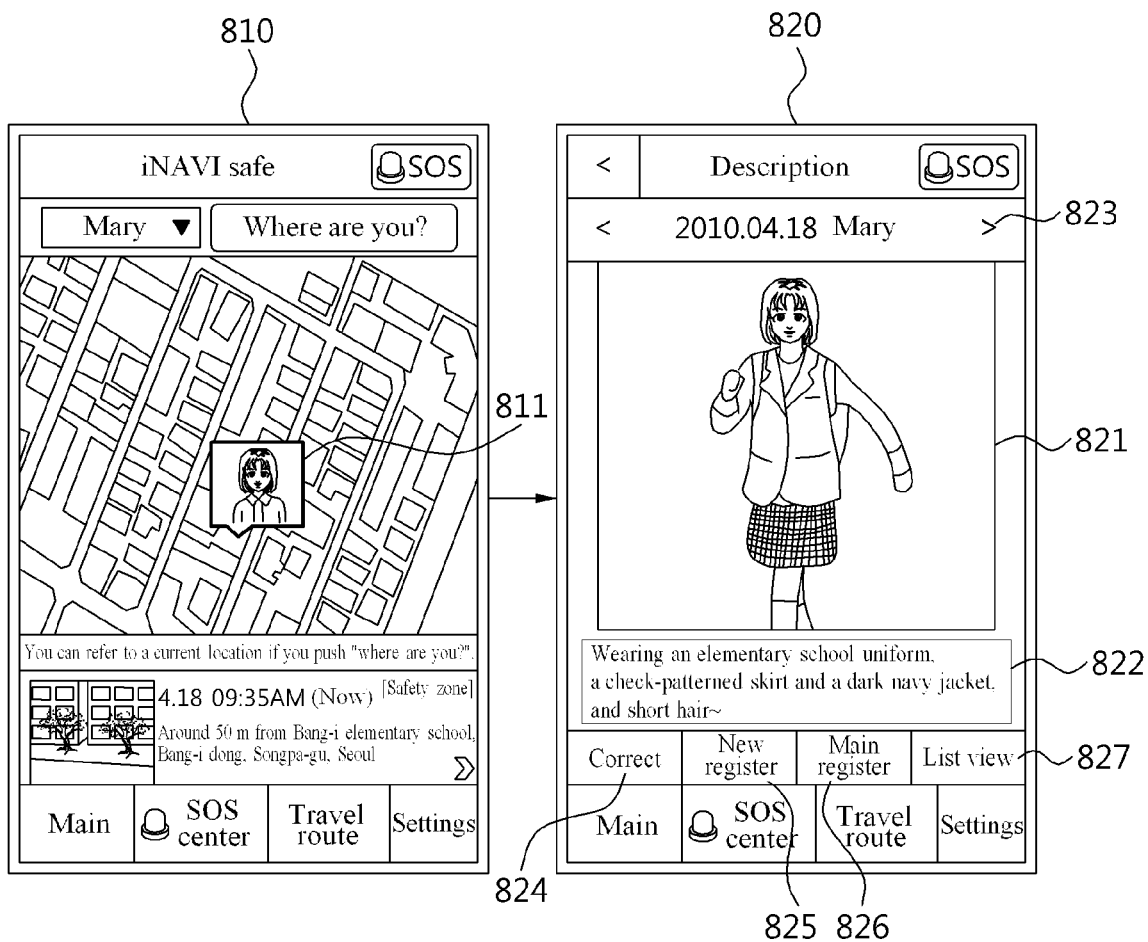
FIG. 8 illustrates an example of a service screen associated with a function of registering a description of a ward according to an embodiment of the present invention.

FIG. 8 illustrates a service screen associated with a function of registering a description of a ward. Referring to FIG. 8, a photo 811 of a ward provided may be provided as a menu of registering or editing descriptions about a plurality of wards on a main page 810 on which it is possible to refer to a location of the ward. In this case, in response to tapping the photo 811 of the ward, the main page 810 may be switched to a description registration screen 820 for registering the description of the ward. Here, description information of the ward most recently registered may be displayed on the description registration screen 820. Also, a page on which a description is recorded based on a date-by-date basis may be provided on the description registration screen 820. In this instance, for the same date, description information most recently registered may be displayed. The description registration screen 820 may provide a function 823 of moving to a previous/next page or a date-by-date page based on currently displayed description information, a "correction" function 824 of correcting the currently displayed description information, a "new registration" function 825 of registering new description information, a "main registration" function 826 of registering the currently displayed description information as a main thumbnail image, a "list view" function 827 of providing a list of description information recently registered based on the currently displayed description information, and the like.

Here, in response to tapping the "correction" function 824 on the description registration screen 820, a mode may be switched to an edition mode and a function 821 of changing a photo of the ward and a function of changing the content that depicts the description may be provided. That is, in response to tapping the "correction" function 824 on the description registration screen 820, a "photo change" icon may be displayed. In response to tapping a portion corresponding to the description content, a keyboard OSD screen may be displayed. Here, a method of changing a photo of the ward may include a method of selecting a photo from an album stored in a guardian terminal, a method of taking a photo using a photographing function of the guardian terminal, and the like. In response to tapping the "new registration" function 825 on the description registration screen 820, a window for entering a photo of the ward and a window for entering content that depicts the description of the ward may be provided. Also, in response to tapping the "main registration" function 826 on the description registration screen 820, the photo of the ward currently displayed on the description registration screen 820 may be registered as a main thumbnail image. In this instance, a predetermined edition tool, for example, an area selection, an image magnification, and an image minification, may be displayed on the description registration screen 820 to be capable of editing the currently displayed photo of the ward. Also, in response to tapping the "list view" function 827 on the description registration screen 820, a list of description information may be displayed in a most recently registered order, for example, by the respective 30 sets of description information based on a present day.

—Ward Location Reference Function

The ward location reference function (hereinafter, a "where are you now?" function) refers to a function of referring to a current location of a ward. Here, the "where are you now?" function may be provided in an LBS environment, and may provide location information indicating a current location of the ward and image information in which a peripheral image of the ward is captured. In particular, the "where are you now?" function refers to a function of selecting a single ward from among a plurality of wards registered by a guardian and thereby referring to a location of the selected ward.

Figure 9:
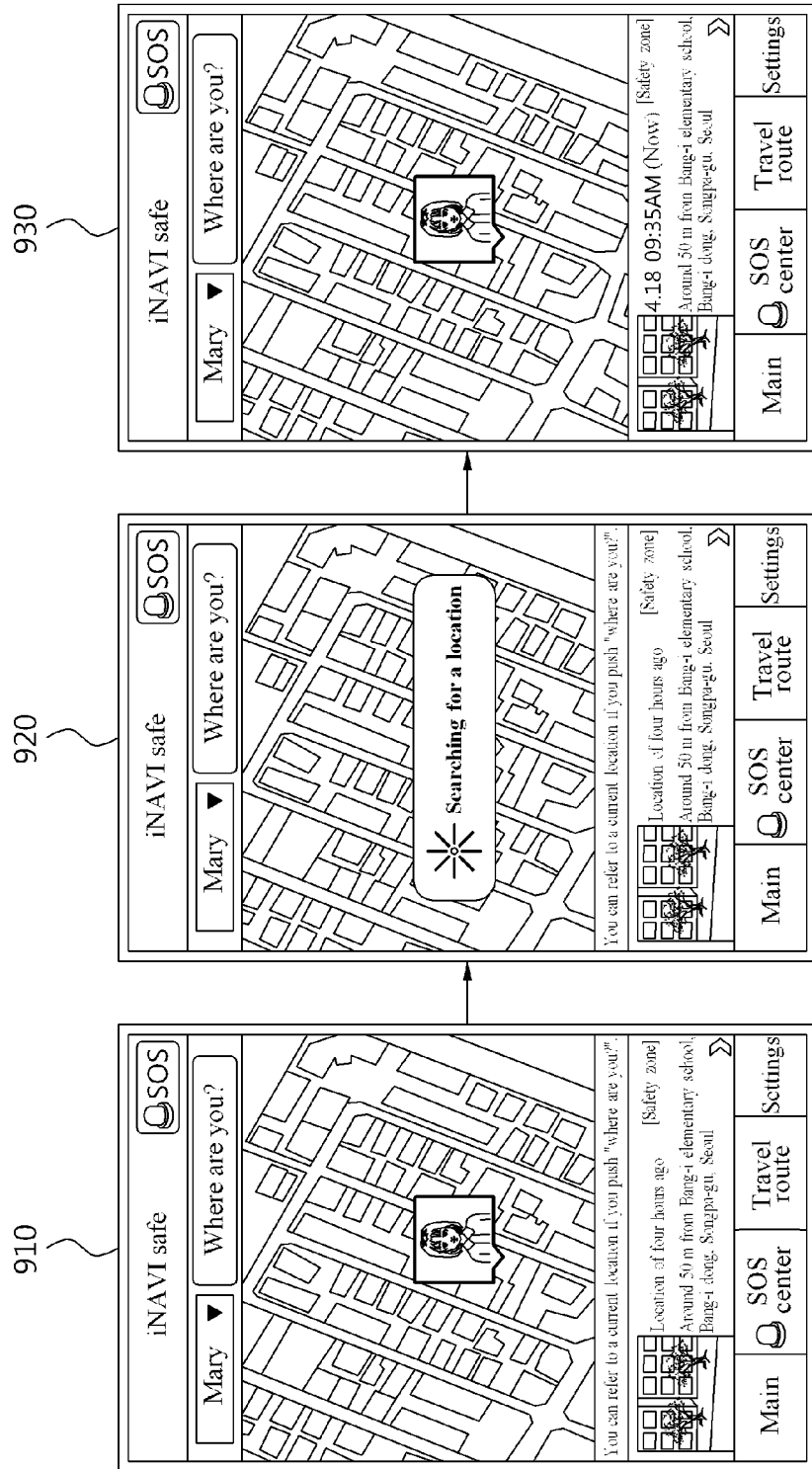
FIGS. 9 through 11 illustrate an example of a service screen associated with a function of referring to a current location of a ward according to an embodiment of the present invention.
Figure 10:
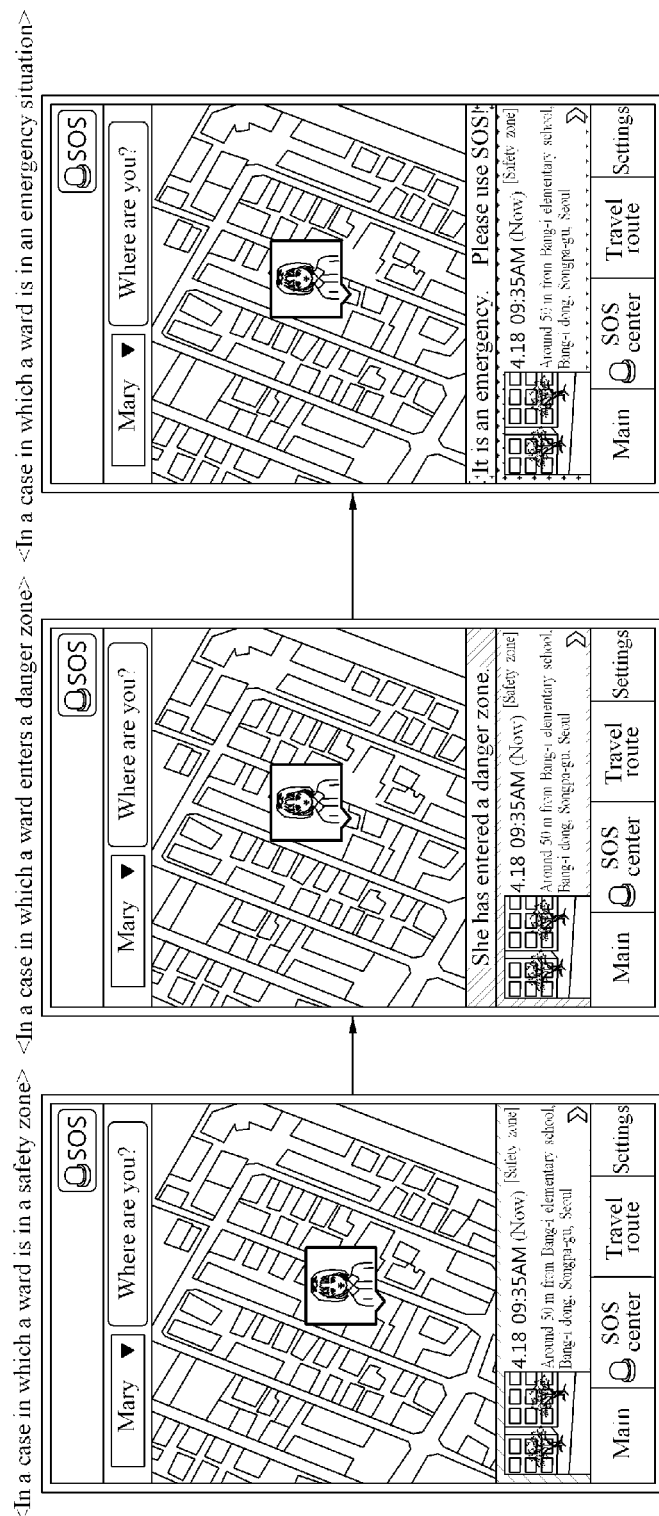
Figure 11:
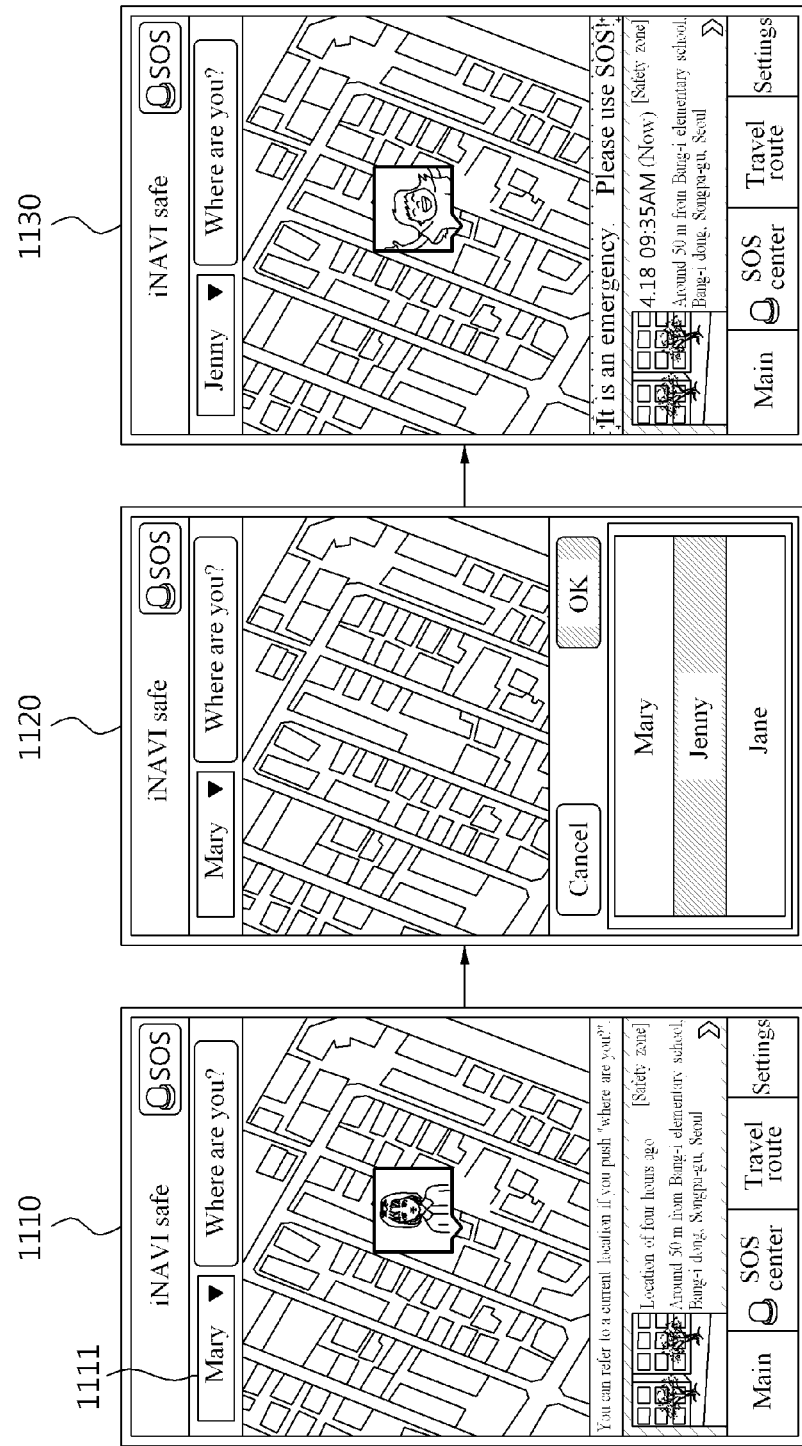

FIG. 9 illustrates a service screen associated with a function of referring to a current location of a ward. Referring to FIG. 9, a main screen 910 that is a page on which it is possible to refer to a location of a ward may provide a ward selection menu 911 of providing a list of wards so that a guardian selects a desired ward from among the plurality of wards. In response to tapping a "where are you now?" function after selecting a desired ward from among the plurality of wards through the ward selection menu 911 on the main screen 910, the main screen 910 may be switched to a location display screen 930 for displaying a map screen on which a current location of the ward is marked on a center of a map, a thumbnail image of the ward, and brief information associated with the current location of the ward. In preparation for a case in which a relatively long amount of time is used to refer to a location of a ward, the main screen 910 may be switched to the location display screen 930 through an in-loading page 920 or a popup and pushup message processing. Here, a current state of the ward based on whether the ward is located within a safety zone or a danger zone registered by the guardian may be displayed on the location display screen 930 based on the current location of the ward. Alternatively, location information and image information may be displayed in different information display forms on the location display screen 930 based on the current state of the ward. Referring to FIG. 10, the current state, for example, a safety zone, a danger zone, and an emergency, of the ward may be directly displayed on the location display screen 930, or may be displayed by changing an information display form of a predetermined area based on the current state of the ward. For example, a background color of an information display area on which brief information associated with the current location and the thumbnail image of the ward are displayed may be indicated in "green" when the ward is located in a safety zone, may be indicated in a "yellow" when the ward is located in a danger zone, and may be indicated in "red" when the ward is in an emergency situation in which the ward has called an SOS dispatch. Referring to FIG. 11, in a case of referring to a location of another ward, in response to tapping a menu 1111 of selecting a ward on a main screen 1110, the main screen 1110 may be switched to a ward list screen 1120 on which a list of wards registered by a guardian is displayed in a ticker form. Here, in response to the guardian selecting another ward from among the plurality of wards on the ward list screen 1120, a screen for displaying a final location reference value, that is, the most recently referred value, of the selected ward may be preferentially provided. In response to the guardian tapping a "where are you now?" function, the ward list screen 1120 may be switched to a location display screen 1130 for providing location information and image information of the selected ward.

Figure 12:
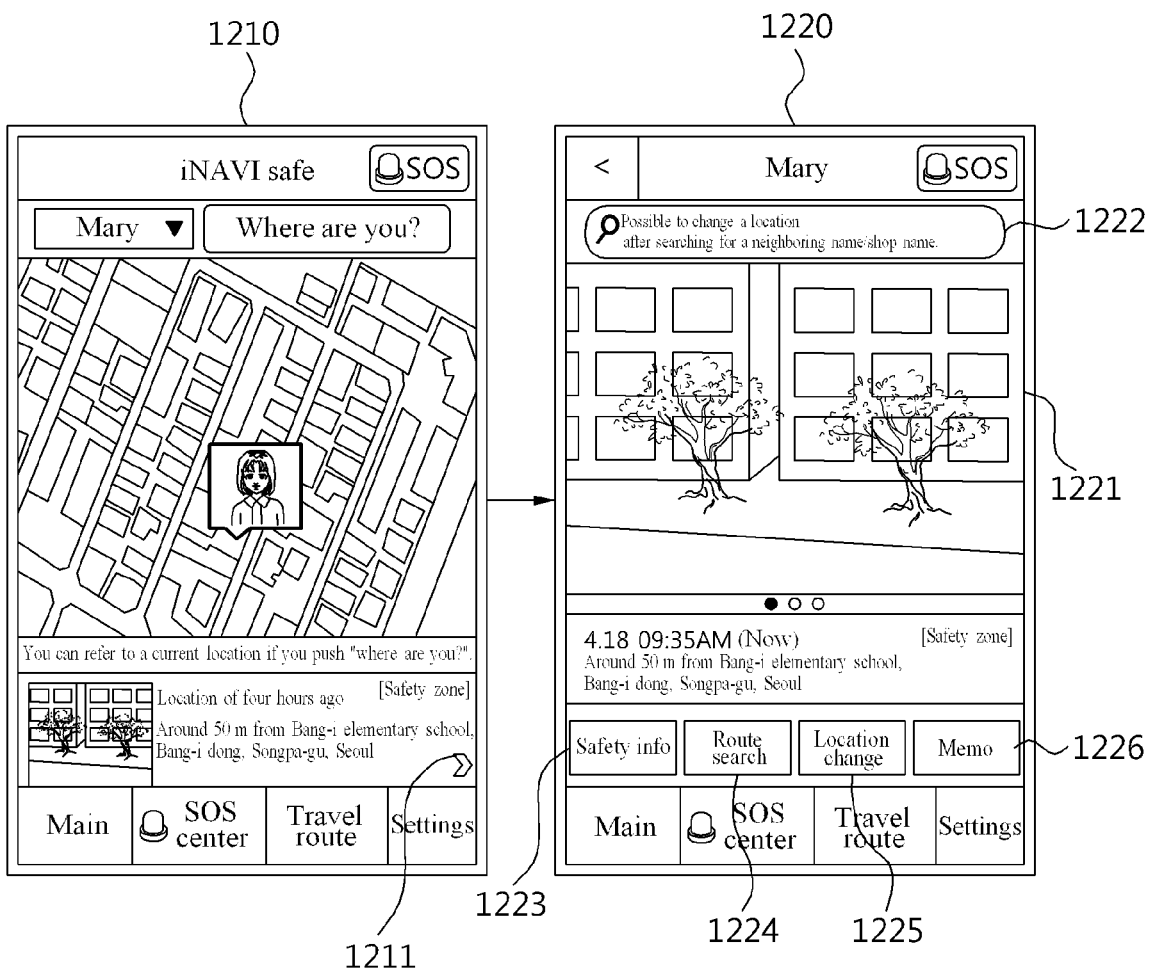
FIGS. 12 through 21 illustrate an example of a service screen associated with a function of detailed information, for example, a peripheral name search, safety information, a route search, a location change, and a memo creation, associated with a current location of a ward according to an embodiment of the present invention.

FIG. 12 illustrates a service screen for providing a detailed function about a current location of a ward. In response to tapping a menu 1211 capable of moving to a detailed page associated with a current location of the ward on a location display screen 1210 that is a result screen of a ward location reference function, the location display screen 1210 may be switched to a service screen 1220 for providing a detailed function about the current location of the ward. Here, a detailed menu including at least one of a video view function 1221 of playing image information of a ward, a search function 1222 of providing a name search based on a map search, a safety information providing function 1223 of providing safety information based on the current location of the ward, a route searching function 1224 of providing a route guide service about the current location of the ward, a location change function 1225 of changing the current location of the ward, and a memo function 1226 of creating and registering a memo associated with the current location of the ward may be displayed on the service screen 1220.

—Video View Function

The video view function refers to a function of displaying image information in which a peripheral image of a ward is captured. Here, the image information may be collected from a ward terminal and may include at least one of at least one photo taken at predetermined time intervals and a moving picture taken during a predetermined period of time. For example, in a case in which image information includes three photos, a corresponding screen may be automatically switched to a subsequent photo in response to tapping a screen area associated with the video view function 1221, or a guardian may view the photos sequentially by directly flicking a photo. Here, which photo is currently displayed may be marked on a screen area associated with the video view function 1221. Similarly, a current state of the ward may be directly displayed on the screen area associated with the video view function 1221, or may be displayed by changing an information display form of a predetermined area based on the current state of the ward.

—Search Function

The search function refers to a function of conducting a search associated with a current location of a ward. A guardian may conduct a name search by using, as a keyword, a shop name, a place name, and the like, obtained from image information of the ward.

Figure 13:
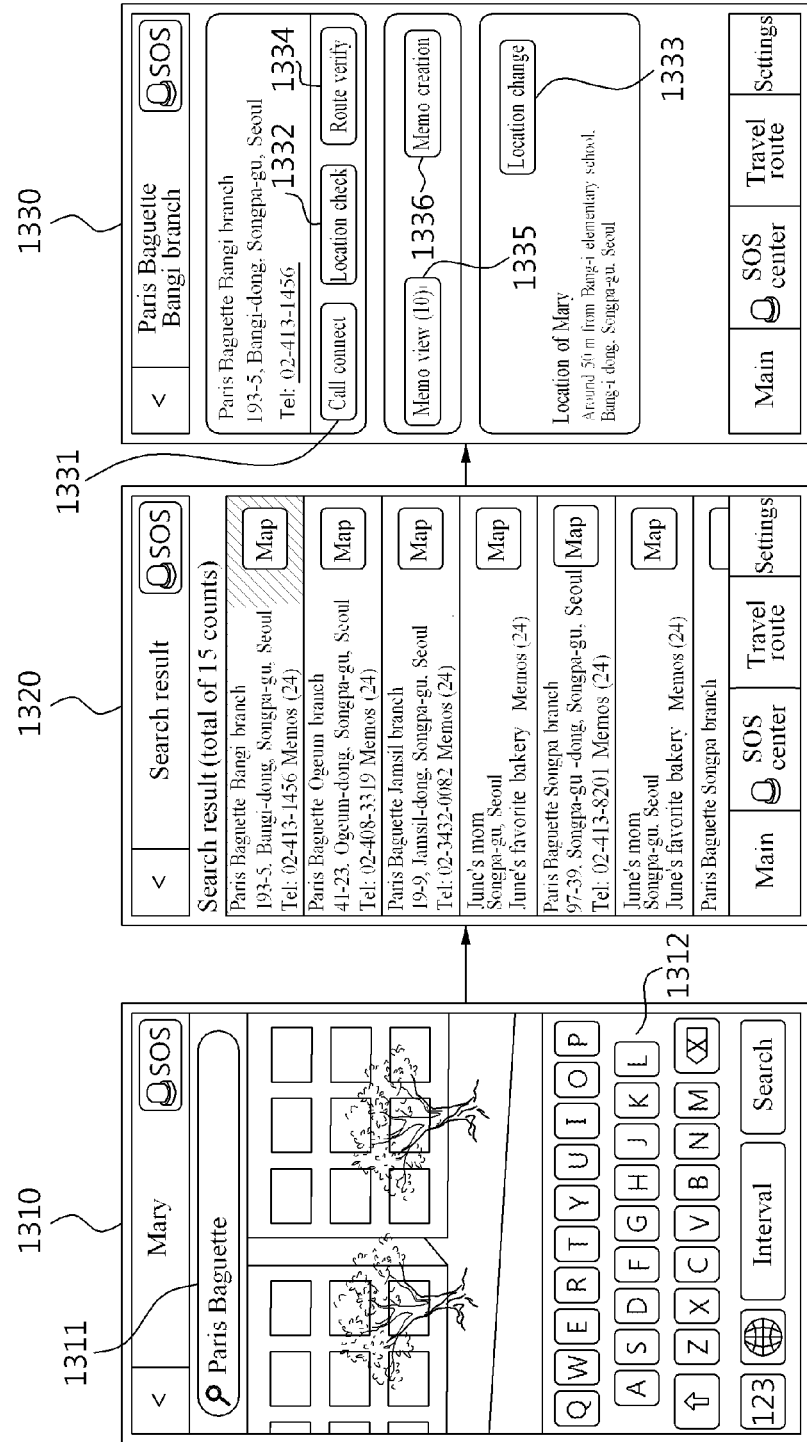
Figure 15:
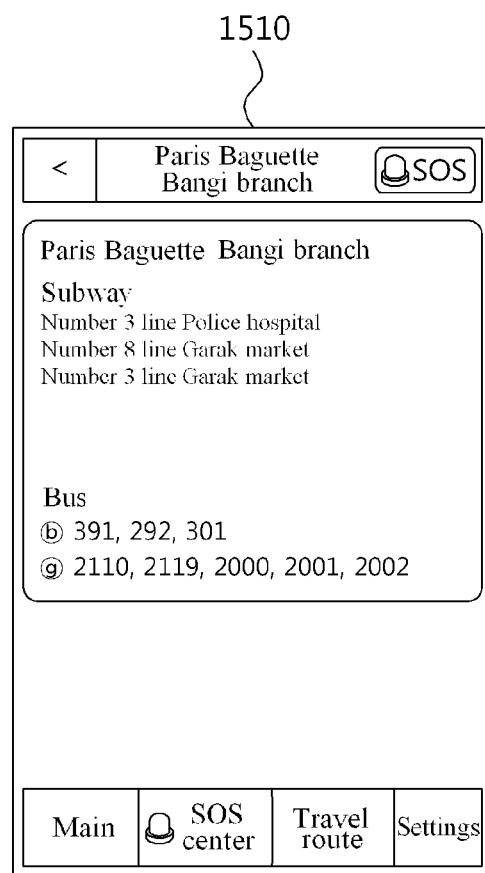
Figure 16:
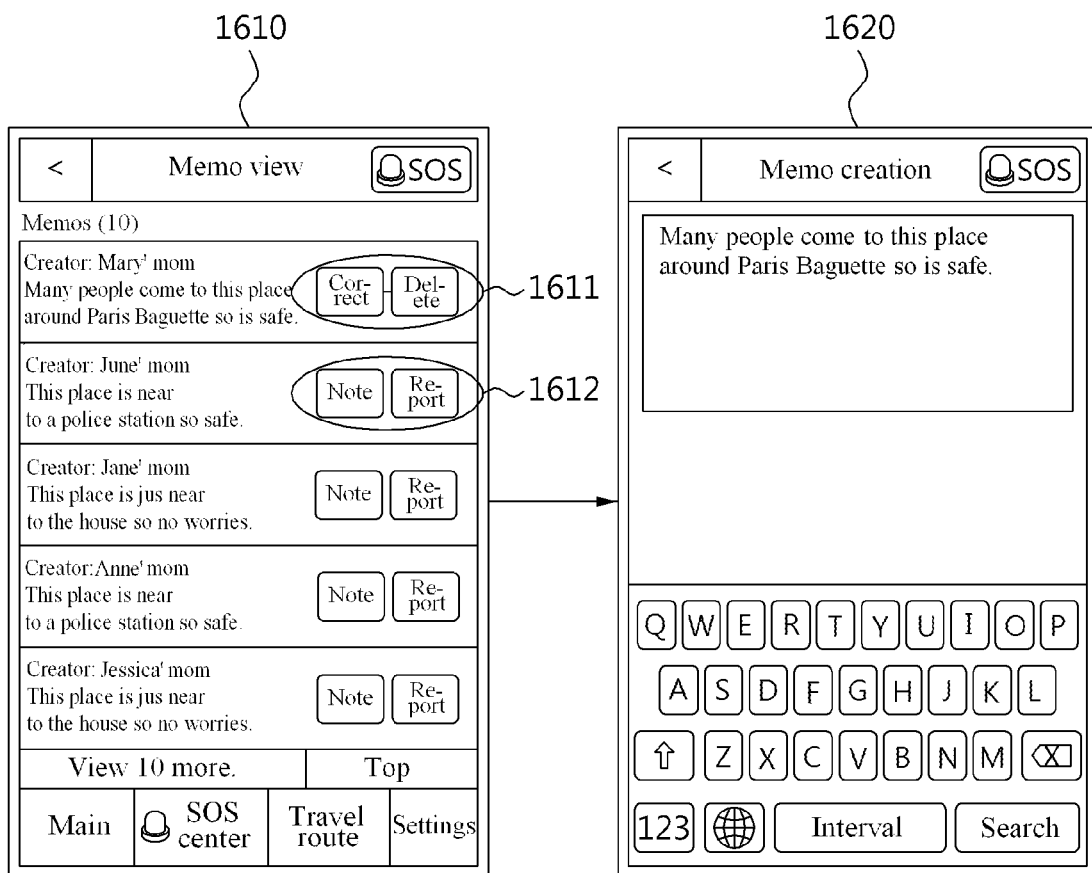

In response to tapping the search function 1222 on the location display screen 1210 of FIG. 12, the location display screen 1210 may be switched to a search screen 1310 of FIG. 13 on which it is possible to conduct a location search. Here, an input window 1311 for entering a name and a keyboard OSD screen 1312 may be displayed on the search screen 1310. A safety service system may conduct a name search by using, as a keyword, a name input to the input window 1311 based on location information of a ward, and may provide a search result on a search result screen 1320. Here, the search result may be configured as a list and an icon for providing a map screen may be activated and thereby displayed for each search result on the search result screen 1320. A location of a place corresponding to the search result and a location of the ward may be displayed together on all the map screens. In response to tapping the entire bar of a predetermined search result from a list on the search result screen 1320, the search result screen 1320 may be switched to a relevant information screen 1330 for providing relevant information associated with the corresponding search result. Here, a detailed menu including at least one of a call connecting function 1331 of making a call to a place associated with a search result, a location verifying function 1332 of providing a map screen of a place associated with the search result, a location change function 1333 of changing a current location of the ward with the place associated with the search result, a route searching function 1334 of providing a route guide service to the place associated with the search result, a memo view function 1335 of providing a list of memos registered by a guardian and/or another person with respect to the place associated with the search result, and a memo creation function 1336 of creating and registering a memo with respect to the place associated with the search result may be displayed on the relevant information screen 1330. In response to the guardian tapping the location verifying function 1332 or the location change function 1333 on the relevant information screen 1330 of FIG. 13, the relevant information screen 1330 may be switched to a map page 1410 on which a location change is possible with respect to the current location of the ward. Here, a current location of a ward and a location of a place associated with a search result may be displayed on the map page 1410. Also, a menu for requesting a location change may be activated and thereby displayed on the map page 1410. In response to the guardian requesting a location change through the corresponding menu on the display page 1410, the current location of the ward may be changed with the location associated with the search result, and the changed location may be stored as a travel route of the ward. Also, in response to the guardian tapping the route searching function 1334 on the relevant information screen 1330 of FIG. 13, the relevant information screen 1330 may be switched to an information providing screen 1510 of FIG. 15 for providing public transportation information used to find the place associated with the search result. In response to the guardian tapping the memo view function 1335 on the relevant information screen 1330 of FIG. 13, the relevant information screen 1330 may be switched to a memo view screen 1610 for configuring, as a list, memos registered by the guardian and/or another person with respect to the place associated with the search result and displaying the list of memos. Here, a menu 1611 capable of correcting or deleting a memo created by the guardian and a menu 1612 capable of writing a note to another person and reporting a hazardous publication with respect to a memo created by the other person may be displayed on the memo view screen 1610. In response to the guardian tapping the memo creation function 1336 on the relevant information screen 1330 of FIG. 13, the relevant information screen 1330 may be switched to a memo creation screen 1620 of FIG. 16 including an input window for creating a memo and a keyboard OSD screen. Once the memo creation is completed on the memo creation screen 1620, the memo creation screen 1620 may be switched to the memo view screen 1610. Also, a newly created memo may be included in a list of memos and thereby displayed. Here, a memo created by the guardian may be registered and managed in association with location information of the place associated with the search result.

—Safety Information Providing Function

The safety information providing function refers to a function of providing safety information in which a point of interest (POI) included in a map screen is classified into a safe POI or a dangerous POI based on a type of the POI, when providing the map screen for displaying a current location of a ward.

Figure 17:
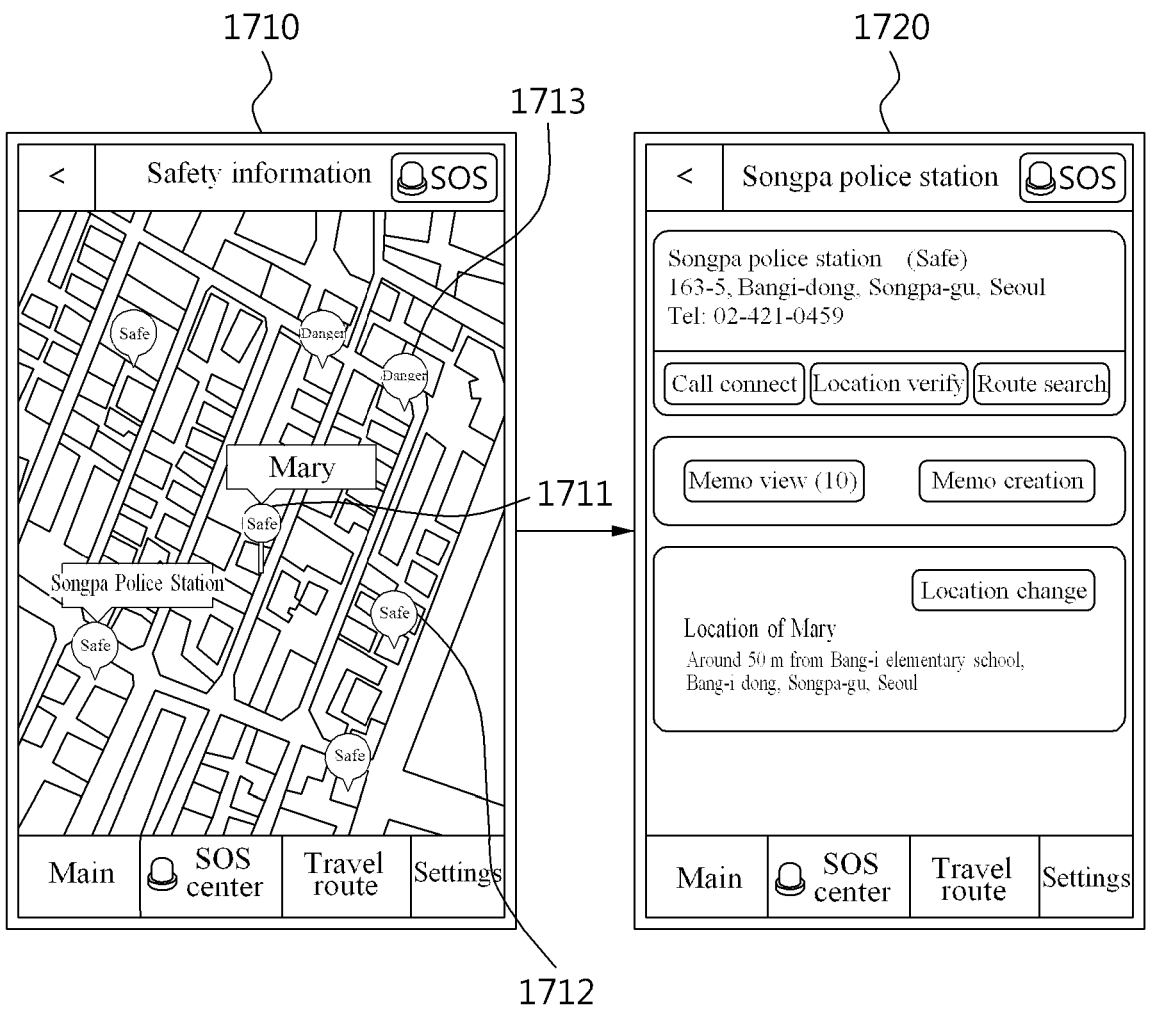

In response to tapping the safety information providing function 1223 on the location display screen 1210 of FIG. 12, the location display screen 1210 may be switched to a safety information page 1710 of FIG. 17. Here, a current location 1711 of the ward may be indicated on a map and a safety POI 1712 and a dangerous POI 1713 based on a location of the ward may be displayed on the safety information page 1710. Also, in response to the guardian selecting icons of the safe POI 1712 and the dangerous POI 1713 on the safety information page 1710, a name of a corresponding POI may be displayed through a speech balloon function. Further, in response to the guardian tapping a POI name, the safety information page 1710 may be switched to a detailed information screen 1720 for displaying detailed information, for example, an address and a telephone number, of a corresponding POI.

—Route Searching Function

The route searching function refers to a function of executing a route guide service by using a location of a guardian as a departure and a location of a ward as a destination.

Figure 18:
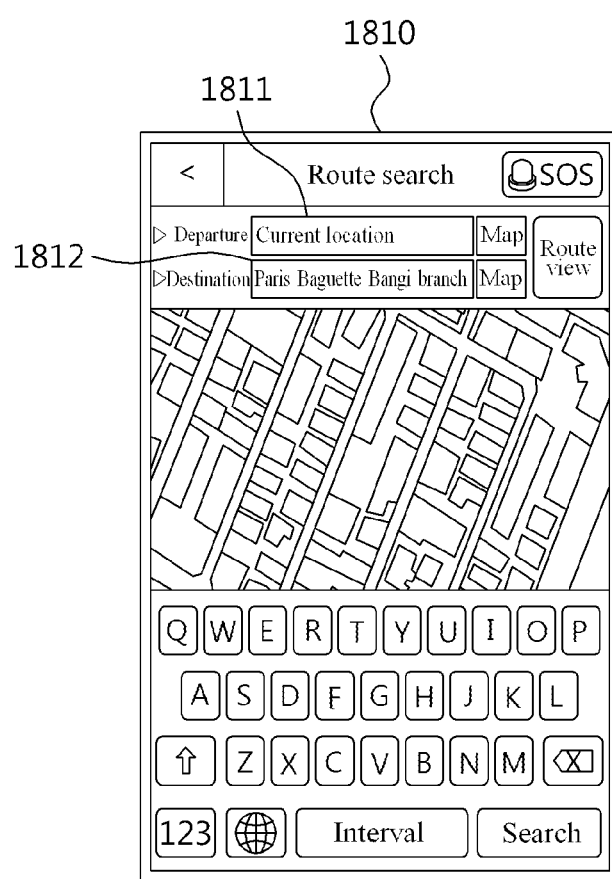

In response to tapping the route searching function 1224 on the location display screen 1210 of FIG. 12, the location display screen 1210 may be switched to a route searching screen 1810 of FIG. 18 for providing a route guide. Here, a departure search window 1811 for searching for a departure and a destination search window 1812 for searching for a destination, a keyboard OSD screen may be displayed on the route searching screen 1810. A current location of the guardian may be displayed as a default value on the departure search window 1811 and a current location of the ward may be displayed as a default value on the destination search window 1812. In response to a touch on a search window, a keyboard may be displayed and thus, it is possible to search for and thereby set a desired region or place name. In response to conducting a name search, a search result list may be provided. In response to a request of the guardian for a map screen about a predetermined search result, an icon may be created on a map and the guardian may directly select a departure or a destination through the icon. When setting of the departure and the destination is completed, a route from the departure to the destination may be displayed on the map and various types of information associated with the route, for example, route briefing information, a recommended route, and public transportation information, may be provided.

—Location Change Function

The location change function refers to a function of moving or changing a current location of a ward to another place.

Figure 14:
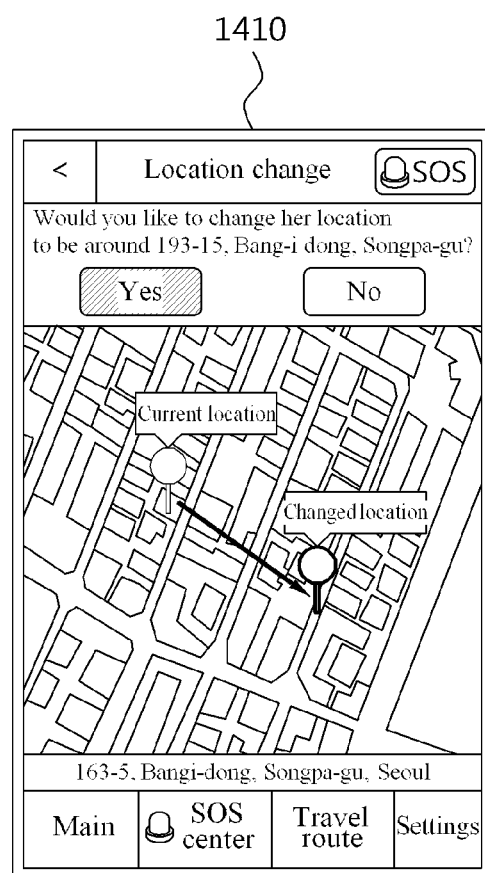
Figure 19:
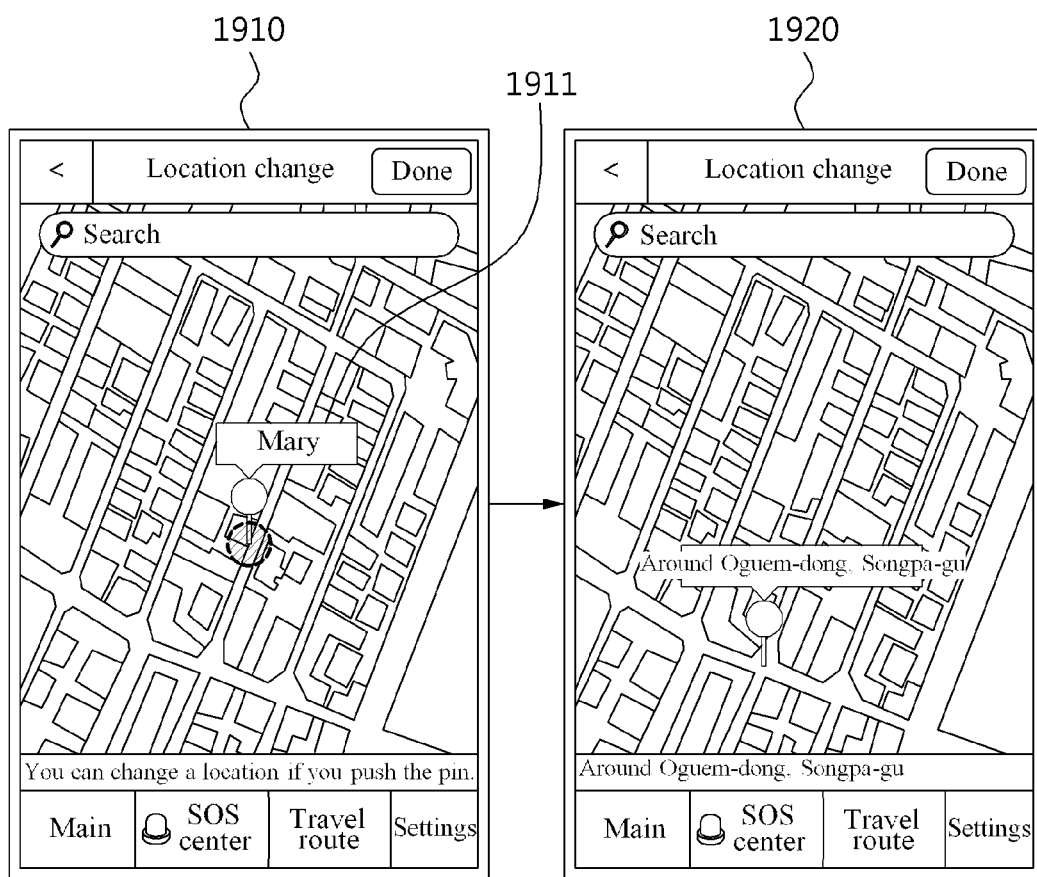

In response to tapping the location change function 1225 on the location display screen 1210 of FIG. 12, the location display screen 1210 may be switched to a map page 1910 of FIG. 19 on which it is possible to change a current location of a ward. Here, the map page 1910 is functionally similar to the map page 1410 of FIG. 14 and may provide a function of changing the current location of the ward by activating a pin 1911 corresponding to the current location of the ward and by pushing the activated pin 1911. When a location of the pin 1911 is changed on the map page 1910, an address of a place of which a location is changed may be displayed on a description area at a lower end of the map together with a speech balloon as illustrated in a map page 1920. Accordingly, in response to the guardian pushing a location change complete button, a location of the ward may be changed to a location set at the pin 1911 and the changed location may be recorded as a travel route of the ward.

—Memo Function

The memo function refers to a function of enabling a guardian to create and register a predetermined comment on a current location of a ward in a memo form. Here, a memo may refer to SNS information that may be shared between guardians using a safety service.

Figure 20:
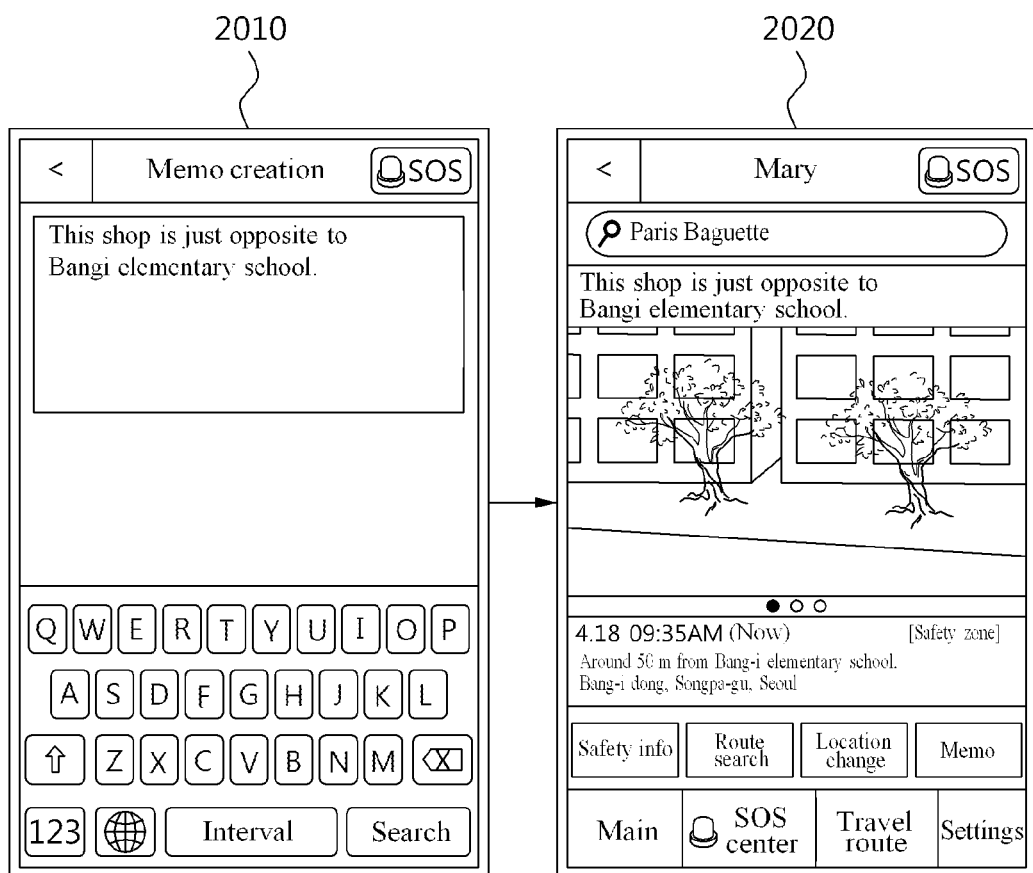

In response to tapping the memo function 1226 capable of creating a memo on the location display screen 1210 of FIG. 12, the location display screen 1210 may be switched to a memo creation screen 2010 of FIG. 20 including an input window for creating a memo and a keyboard OSD screen. Here, the memo creation screen 2010 is functionally similar to the memo creation screen 1620 of FIG. 16. Once the memo creation is completed on the memo creation screen 2010, log content according to the memo may be displayed at an upper end of a location display screen 2020 that is a result screen according to a ward location reference function. For example, the full content of the memo may be displayed at the upper end of the location display screen 2020. Also, the memo may be translucently displayed on an area on which image information of the ward is displayed. Here, a memo capable of "creating a memo" on the location display screen 1210 of FIG. 12 may be changed to a "memo correction" menu capable of correcting a memo on the location display screen 2020 on which the memo creation is completed. Also, using the memo function, the guardian may create a memo and then set whether to disclose the created memo. Accordingly, a menu for setting whether to disclose a memo may be provided on the memo creation screen 2010. A memo created by the guardian may be registered and managed in association with location information corresponding to a current location of the ward.

—Neighbor Log Function

The neighbor log function refers to a function of sharing information between guardians using a safety service based on an SNS.

Figure 21:
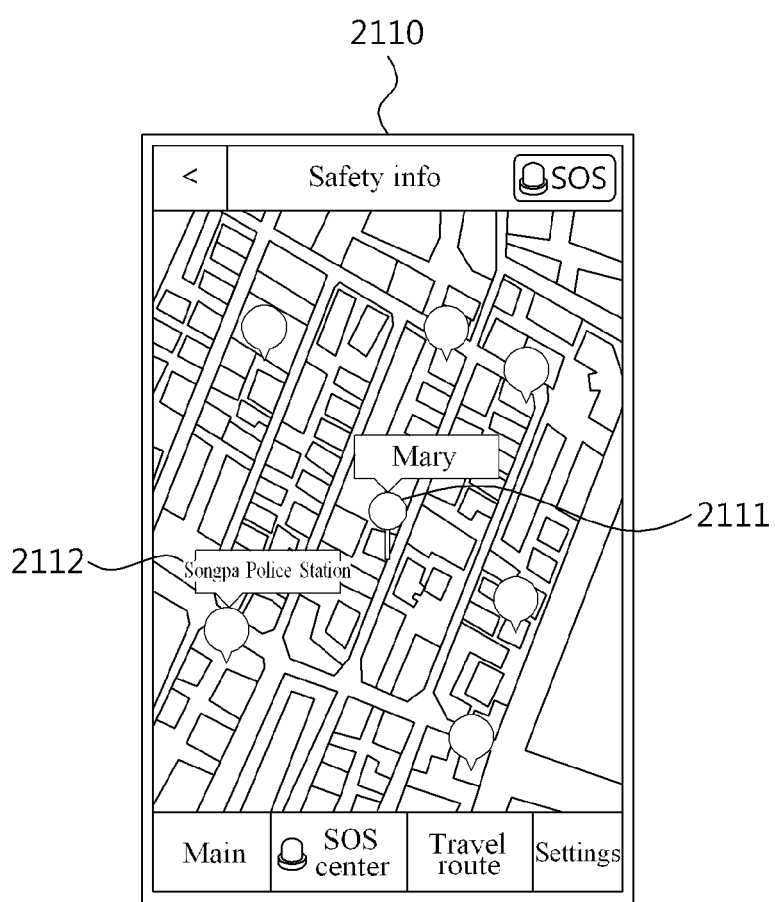

In response to tapping "where are you now?" on a main screen (see FIG. 9) that is a page on which it is possible to refer to a location of a ward, the main page may be switched to a location display screen 2110 of FIG. 21 for displaying a current location 2111 of the ward. Here, log information of a memo created by another person may be displayed on the location display screen 2110. That is, after searching for memos associated with location information within a predetermined radius based on the current location 2111 of the ward, a memo allowed to be disclosed may be displayed on the location display screen 2110. Referring to FIG. 21, the current location 2111 of the ward on a map and a neighbor log POI 2112 based on the current location 2111 of the ward may be displayed on the location display screen 2110. Here, the neighbor log POI 2112 that is a POI corresponding to location information for each memo may be displayed on the location display screen 2110. Accordingly, in response to a guardian selecting an icon of the neighbor log POI 2112, other person information, for example, a name, associated with another person having created a corresponding memo may be displayed. Further, in response to the guardian tapping other person information of the neighbor log POI 2112, the full content of the memo may be displayed.

—SOS Function

The SOS function refers to a service capable of substantially coping with an emergency situation of a ward. In response to an occurrence of a danger to the ward, a guardian may verify the safety of the ward through a security company or may cope with the danger to the ward using the SOS function. Using the SOS function, the ward may call an SOS through a ward terminal in response to the occurrence of the danger to the ward. Alternatively, when a safety service system determines that the danger to the ward has occurred based on location information of the ward, the safety service system may provide the guardian with location information and image information of the ward using the SOS function, so that the guardian may verify the location information and the image information and thereby call dispatch of the security company. In this case, a message notifying an emergency situation of the ward may be preferentially transferred to the guardian through a text service and the like. Also, when the guardian determines that the ward is in an emergency situation while monitoring location information and image information of the ward, the guardian may directly call dispatch of the security company using the SOS function. That is, the SOS function may be executed in at least one of a case in which an SOS dispatch call of the guardian is present on a service screen for providing a current location of the ward, a case in which an abnormal signal occurs in a ward terminal, a case in which location information of the ward is deviated from a safety zone set by the guardian, a case in which the location information of the ward enters a danger zone set by the guardian, and the like.

FIGS. 22 through 25 illustrate a service screen associated with an SOS function capable of coping with an emergency situation of a ward.

Figure 22:
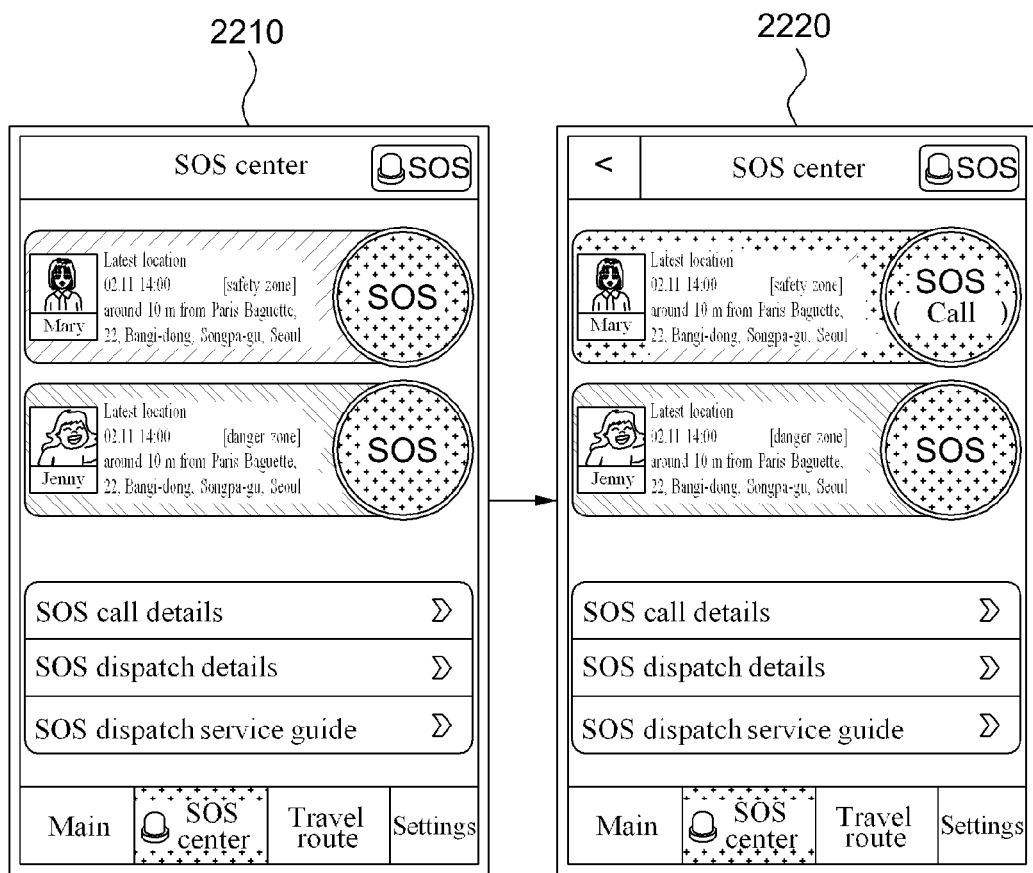
FIGS. 22 through FIG. 25 illustrate an example of a service screen associated with an SOS function capable of coping with an emergency situation of a ward according to an embodiment of the present invention.
Figure 23:
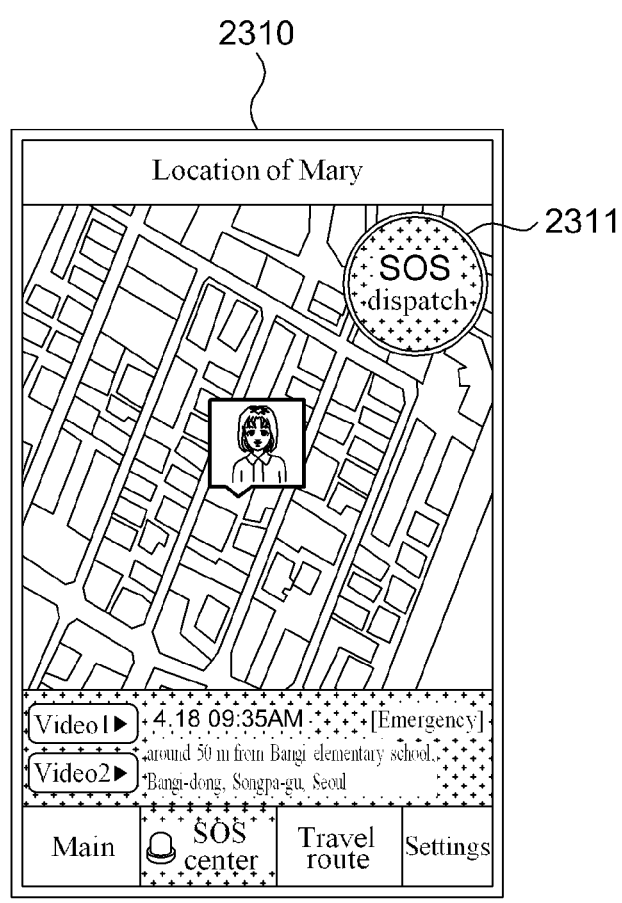

In response to tapping the menu 525 associated with the SOS function on the main screen 520 of FIG. 2, the main screen 520 may be switched to an SOS center screen 2210 of FIG. 22 for providing an SOS dispatch call menu. Here, a current location and a current state, for example, a safety zone, a danger zone, and emergency, of the ward may be displayed on the SOS center screen 2210. A menu for moving to a detailed page on which location information and image information of the ward is provided may be activated and displayed. Also, a calling target, such as a call by the guardian, a call by the ward, and a call by a safety service system, may be displayed on the SOS center screen 2210. Alternatively, a display form of the SOS center screen 2210 may be classified and thereby displayed based on the calling target. In response to the guardian tapping the menu for moving to the detailed page on the SOS center screen 2210, the SOS center screen 2210 may be switched to an information verifying screen 2310 of FIG. 23 including a map screen for displaying a current location of a ward, a function capable of playing image information of the ward, and an SOS menu 2311 of requesting a security company for an SOS dispatch with respect to the corresponding ward. That is, the guardian may verify a location and an image of the ward on the information verifying screen 2310. In this example, when the guardian determines that the ward is in an emergency situation, the guardian may request the SOS dispatch by tapping the SOS menu 2311. In response thereto, the safety service system may transmit information, for example, location information, image information, and description information, of the ward to the security company, such that the security company may verify the safety of the ward and cope with the emergency situation. In response to the SOS dispatch call for the ward on the information verifying screen 2310, the information verifying screen 2310 may be switched to a call details screen 2220 of FIG. 22 for displaying new call information. Here, an SOS dispatch call state with respect to the ward for which the SOS dispatch has been requested may be displayed on the call details screen 2220 using a flicking method.

Figure 24:
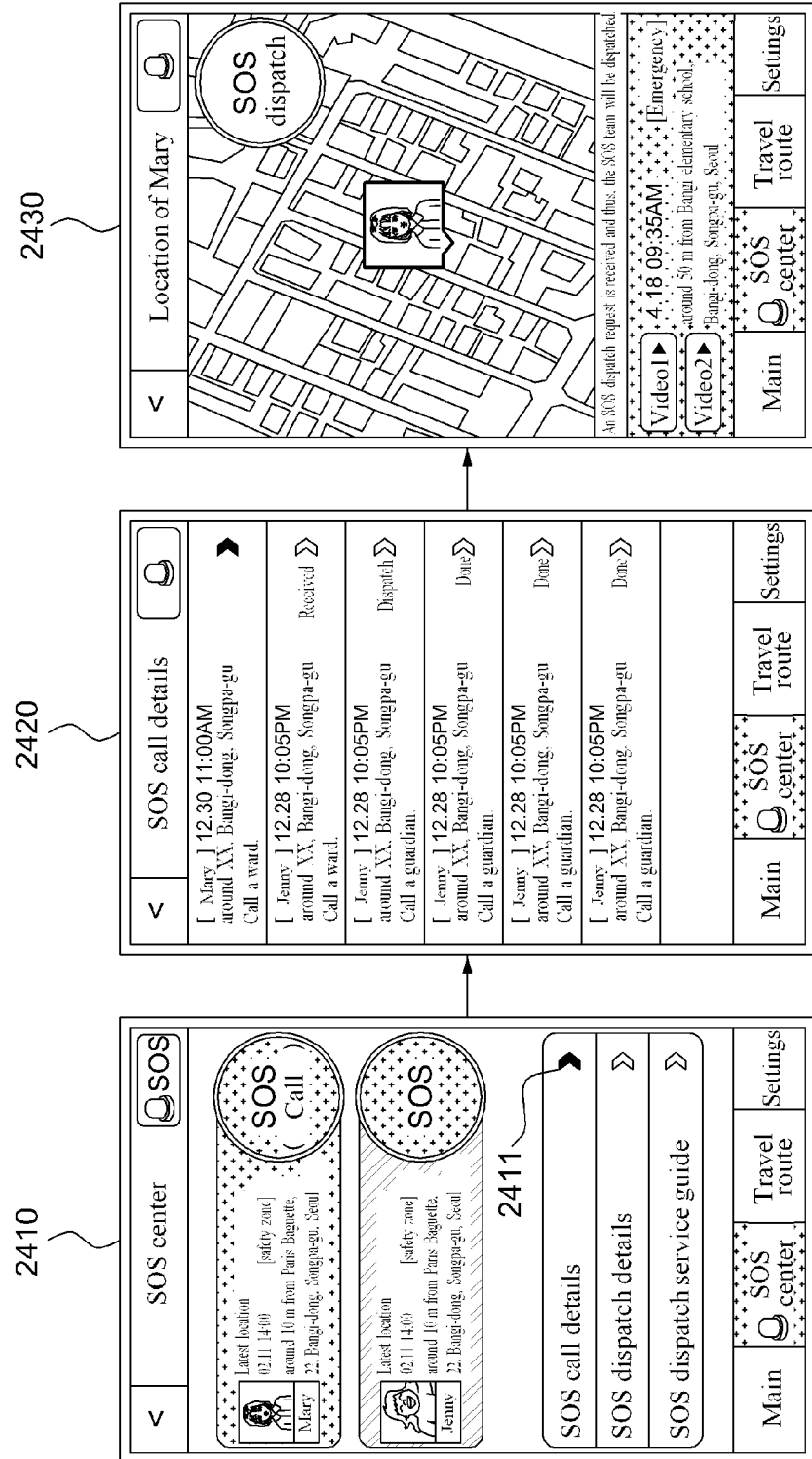
Figure 25:
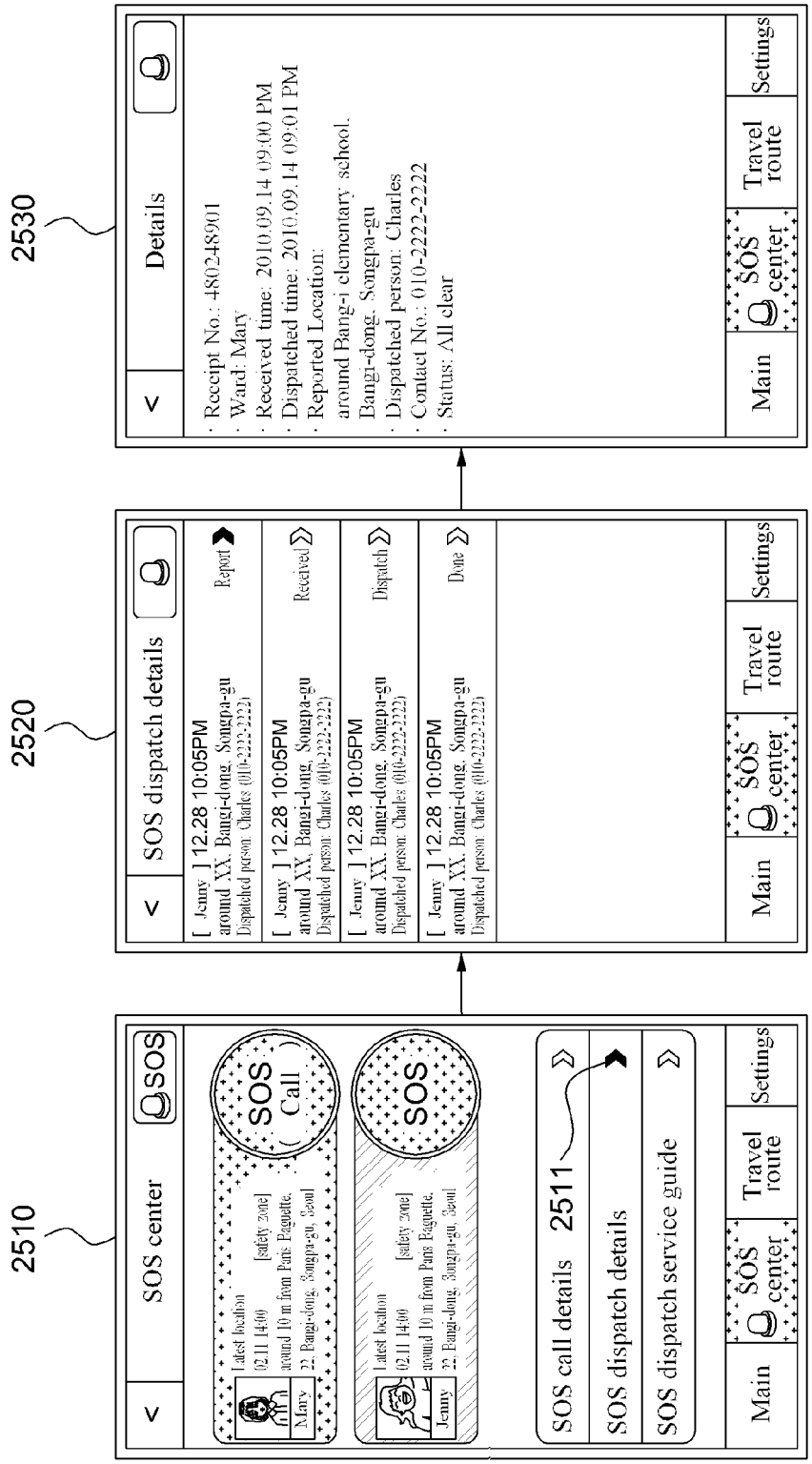

Referring to FIG. 24, a menu associated with a reference function of referring to details of a SOS dispatch call reported to a security company, a current state of the ward processed at the security company, and processing details thereof may be displayed on an SOS related screen 2410, for example, the SOS center screen 2210 and the call details screen 2220 of FIG. 22. In response to a guardian tapping a menu 2411 for referring to SOS dispatch call details among menus displayed on the SOS related screen 2410, the SOS related screen 2410 may be switched to an SOS call details screen 2420 for displaying details of the SOS dispatch call reported with respect to the ward. Here, a list of SOS dispatch calls may be created and brief information, for example, a time at which the SOS dispatch call is reported and a current processing state, may be displayed for each call on the SOS call details screen 2420. In response to the guardian tapping a predetermined call from a list of SOS dispatch calls on the SOS call details screen 2420, the SOS call details screen 2420 may be switched to a details verifying screen 2430 for displaying details, for example, a time at which a SOS dispatch call is reported, a location of the ward when the SOS dispatch call is reported, a calling target having reported the SOS dispatch call, for example, a call by the ward and a call by the guardian, a current processing state of the SOS dispatch call, and the like. Also, referring to FIG. 25, in response to a guardian tapping a menu 2511 of referring to SOS dispatch details among menus displayed on an SOS related screen 2510, the SOS related screen 2510 may be switched to an SOS dispatch details screen 2520 for displaying details of dispatch taken by a security company in response to an SOS dispatch signal call. Here, a list of details of dispatches taken by the security company with respect to the ward in response to an SOS dispatch call may be created and brief information, for example, a time at which the SOS dispatch call is reported and a name of a security agent having actually reacted, may be displayed for each dispatch on the SOS dispatch details screen 2520. In response to the guardian tapping a predetermined dispatch on the SOS dispatch details screen 2520, the SOS dispatch details screen 2520 may be switched to a details verifying screen 2530 for displaying details, for example, a reference number of the SOS dispatch, a name of the ward, a time at which the SOS dispatch is received, a dispatched time for the ward, a reported place, that is, a location of the ward at which the SOS dispatch call is reported, a name and a contact number of a security agent having been dispatched to the ward, and a state of the ward verified by the security agent. The aforementioned SOS related screen may provide a function of guiding the overall service associated with an SOS function, for example, what an SOS function is, how to make an SOS dispatch call, how a security company reacts to the call, fee schedules, and the like.

—Travel Route Function

The travel route function refers to a function of accumulating location information of a ward collected from a ward terminal and providing a travel route that is a trace along which the ward has moved.

Figure 26:
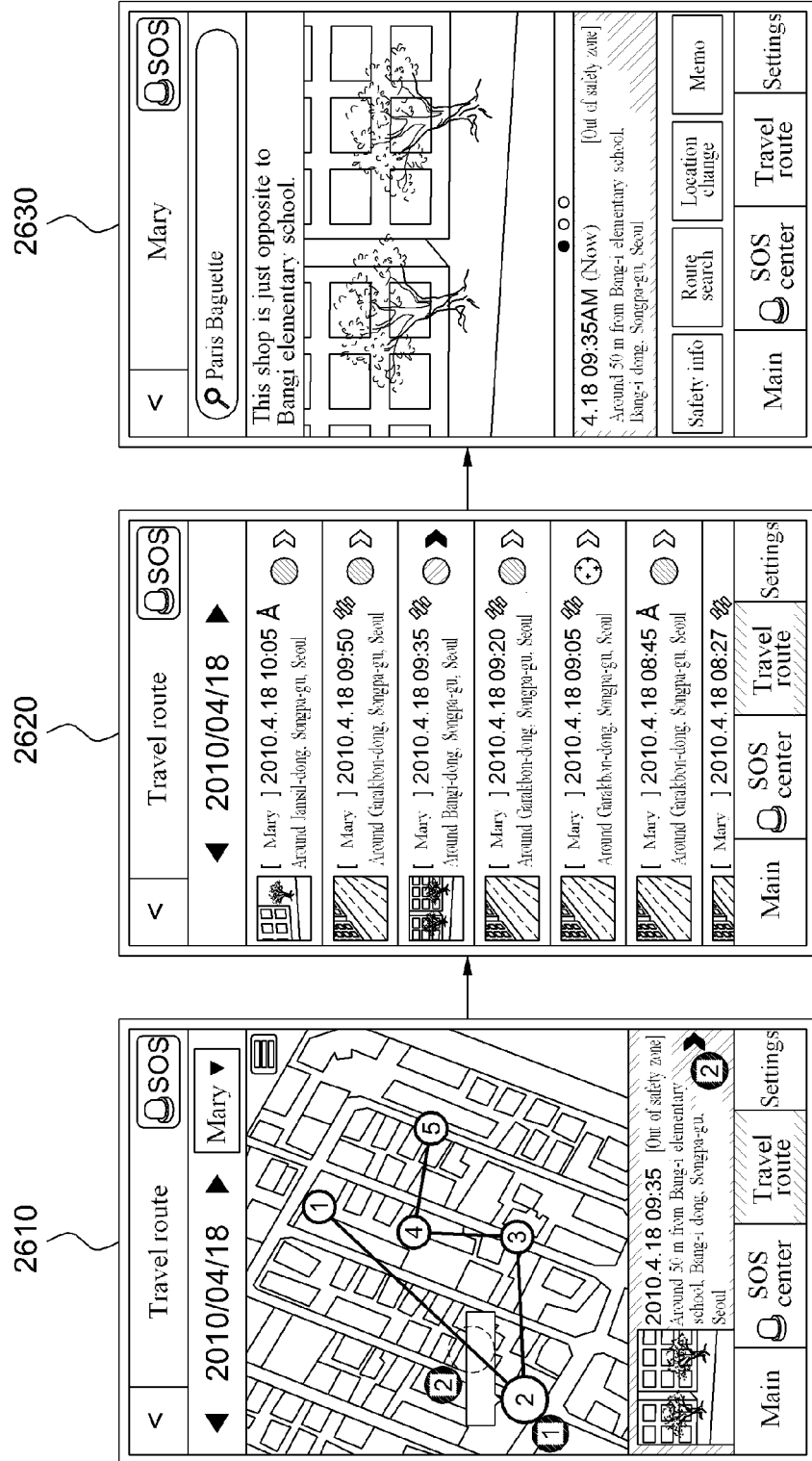
FIG. 26 illustrates an example of a service screen associated with a function of referring to a travel route that is a travel trace of a ward according to an embodiment of the present invention.

FIG. 26 illustrates a service screen associated with a travel route function.

Referring to FIG. 26, in response to tapping the travel route menu 528 associated with the travel route function on the main screen 520 of FIG. 5, the main screen 520 may be switched to a travel route screen 2610 for displaying a travel route of the ward. Here, a travel route based on a date-by-date basis may be provided on the travel route screen 2610 and location information of the ward may be displayed in a log form on a map of the travel route screen 2610. Location information of the ward collected at predetermined time intervals may be connected based on the temporal elapse and thereby displayed on the map of the travel route screen 2610. Here, a number corresponding to a travel sequence may be indicated on a POI corresponding to each set of location information. In response to the guardian tapping a POI indicated with a number on the travel route screen 2610, brief information may be displayed at a lower end of the travel route screen 2610 together with a speech balloon indicating a collected time. Also, in response to the guardian tapping the speech balloon or brief information at the lower end of the travel route screen 2610, the travel route screen 2610 may be switched to a service screen 2630 for providing a detailed function about a corresponding location. Here, a function of the service screen 2630 may be similar to a function of the service screen 1220 of FIG. 12. Also, a menu associated with a function of accumulating location information corresponding to a travel route of the ward and displaying the accumulated information as a list may be provided on the travel route screen 2610. In response to the guardian tapping the corresponding menu on the travel route screen 2610, the travel route screen 2610 may be switched to a list screen 2620 for sorting and thereby displaying location information of the ward for each item.

—Setting Function (Settings of Environment)

The setting function refers to a function of setting a usage environment of a guardian with respect to a safety service.

FIGS. 27 through 37 illustrate a service screen associated with a setting function.

Figure 27:
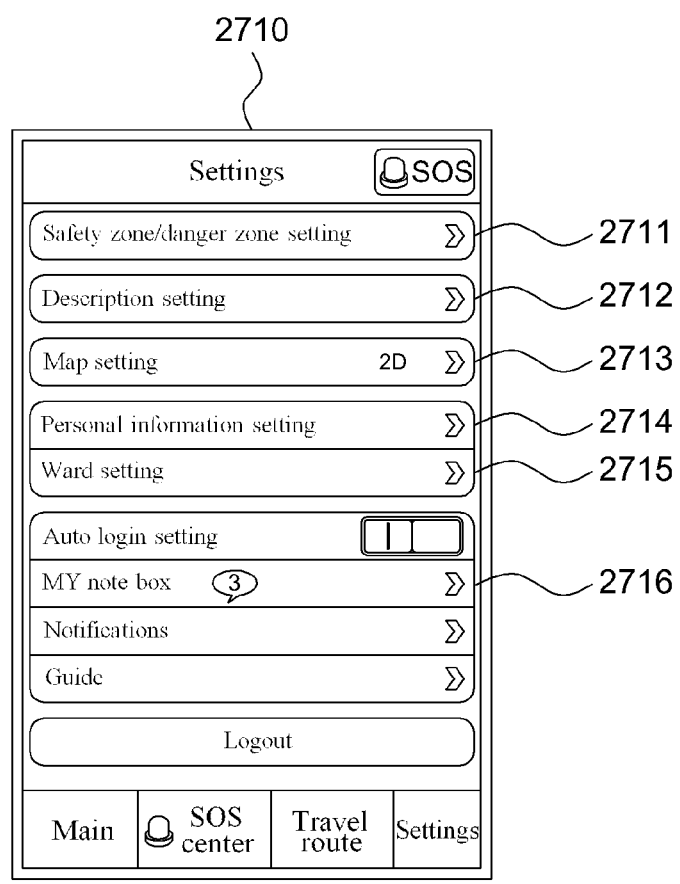
FIGS. 27 through 34 illustrate an example of a service screen associated with various types of setting functions, for example, a setting of a safety zone/danger zone, a setting of a description, a setting of a map, a setting of personal information, and a setting of a ward, about a safety service according to an embodiment of the present invention.

Referring to FIG. 27, in response to tapping the setting menu 520 associated with the setting function on the main screen 520 of FIG. 5, the main screen 520 may be switched to a setting screen 2710 on which it is possible to verify a current service use state or perform various environment settings. Here, the setting screen 2710 may provide a safety zone/danger zone setting function 2711 of managing a safety zone and a danger zone with respect to a ward, a description setting function 2712 of registering or editing description information of the ward, a map setting function 2713 of setting a type of a map displayed on the service screen, a personal information setting function 2714 of setting personal information of a guardian, a ward setting function 2715 of setting a plurality of wards, a MY note box function 2716 of managing a note, and the like.

—Setting of Safety Zone/Danger Zone

Figure 28:
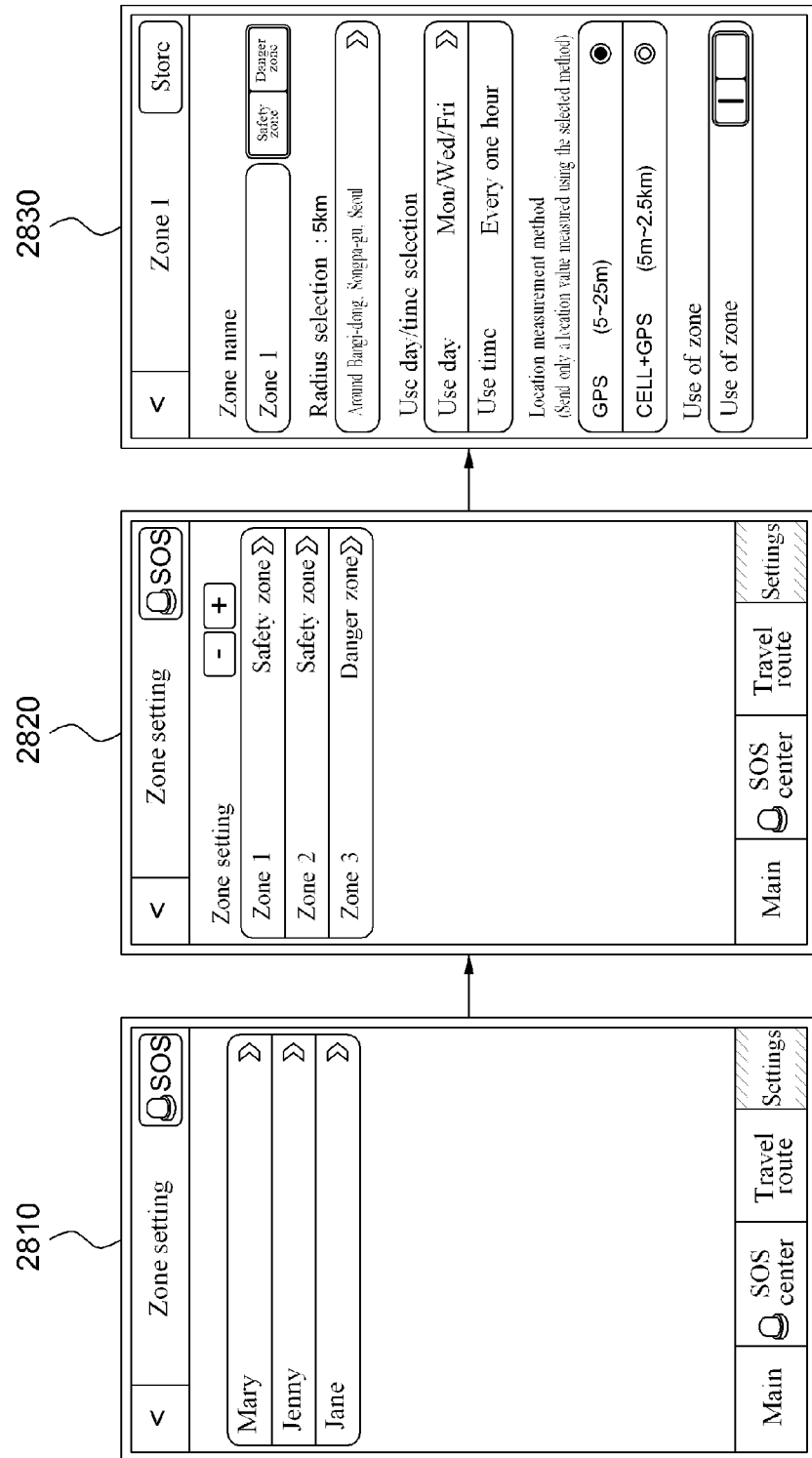

In response to a guardian tapping the safety zone/danger zone setting function 2711 on the setting screen 2710 of FIG. 27, the setting screen 2710 may be switched to a zone setting screen 2810 or 2820 of FIG. 28 on which it is possible to set a safety zone and a danger zone for each ward registered by the guardian. In response to the guardian selecting a ward on the zone setting screen 2810 or 2820 and then tapping a corresponding menu associated with the selected ward, the zone setting screen 2810 or 2820 may be switched to an input screen 2830 for entering a specific condition about the safety zone or the danger zone. Here, a menu associated with a function of entering a name of the safety zone or a danger zone, a function of classifying and thereby setting a type of the safety zone or the danger zone of which the name is entered, a function of setting a radius of the safety zone or the danger zone, a function of setting a time, for example, a use day and a use time, at which the safety zone or the danger zone is to be used, and a function of setting a location measurement method of the ward may be displayed on the input screen 2830. Here, the function of setting a radius of the safety zone or the danger zone may preferentially provide a map page on which it is possible to conduct a name search and select a location (pin). For example, in response to the guardian selecting a predetermined location as a pin on the map page and adjusting a corresponding radius, an area within the corresponding radius based on the selected location may be set as the safety zone or the danger zone. Also, the safety zone or the damager area set by the guardian with respect to the ward may be displayed as a list on the zone setting screen 2820. Further, the zone setting screen 2820 may provide a function of adding a new safety zone or danger zone or deleting/correcting an existing safety zone or danger zone.

—Setting of Description

Figure 29:
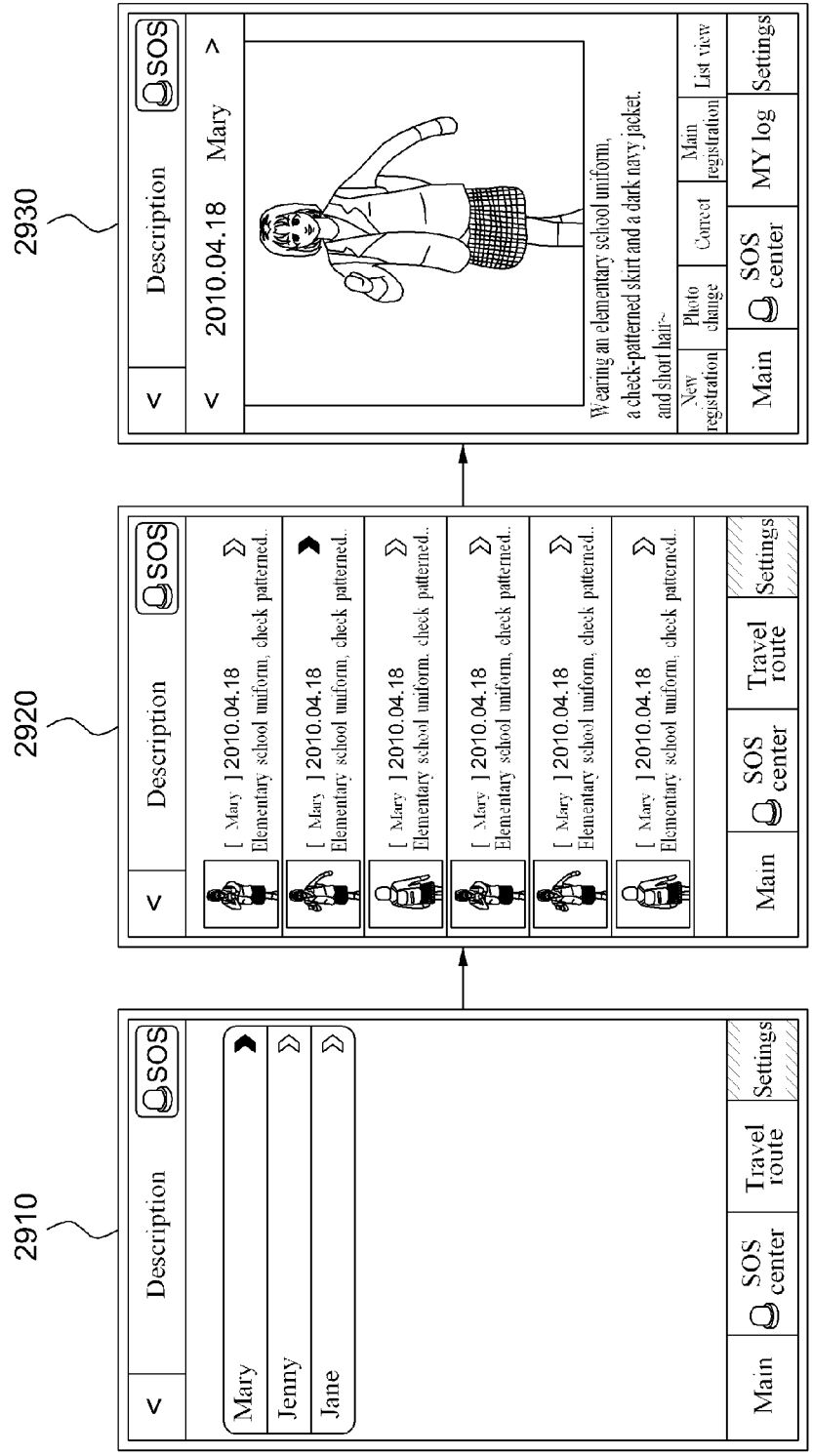

In response to a guardian tapping the description setting function 2717 on the setting screen 2710 of FIG. 27, a ward list screen 2910 of FIG. 29 for displaying a list of wards registered by the guardian may be preferentially displayed. Also, in response to tapping a predetermined ward on the ward list screen 2910, the ward list screen 2910 may be switched to a description screen 2920 for displaying a list of predetermined sets of description information most recently registered with respect to the predetermined ward. In response to the guardian tapping a predetermined item on the description screen 2920, detailed description information of the corresponding item may be displayed on the description screen 2920 and the description screen 2920 may be switched to a description registration screen 2930 on which it is possible to register a description of the ward. Here, the description registration screen 2930 may be functionally similar to the description registration screen 820 of FIG. 8, and may provide a function of moving to a previous/next page or a date-by-date page based on currently displayed description information, a function of correcting currently displayed description information, for example, a photo and content, a function of registering new description information, a function of registering currently displayed description information as a main thumbnail image, and a function of moving to the description screen 2920, and the like.

—Setting of Map

Figure 30:
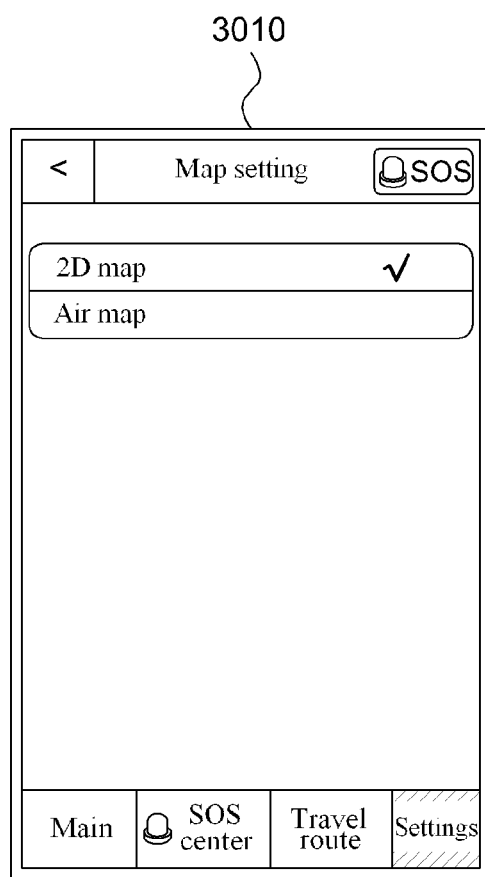

In response to a guardian tapping the map setting function 2713 of setting a type of a map on the setting screen 2710 of FIG. 27, the setting screen 2710 may be switched to a map setting screen 3010 of FIG. 30 for setting a type of a map screen. Here, a list of map types that can be provided from a safety service system, such as a two-dimensional (2D) map and an air map such as a satellite map, may be provided on the map setting screen 3010. The guardian may select, from the list of map types, a map type that the guardian desires to be provided with from a safety service through a service screen and then set the selected map type.

—Setting of Personal Information

Figure 31:
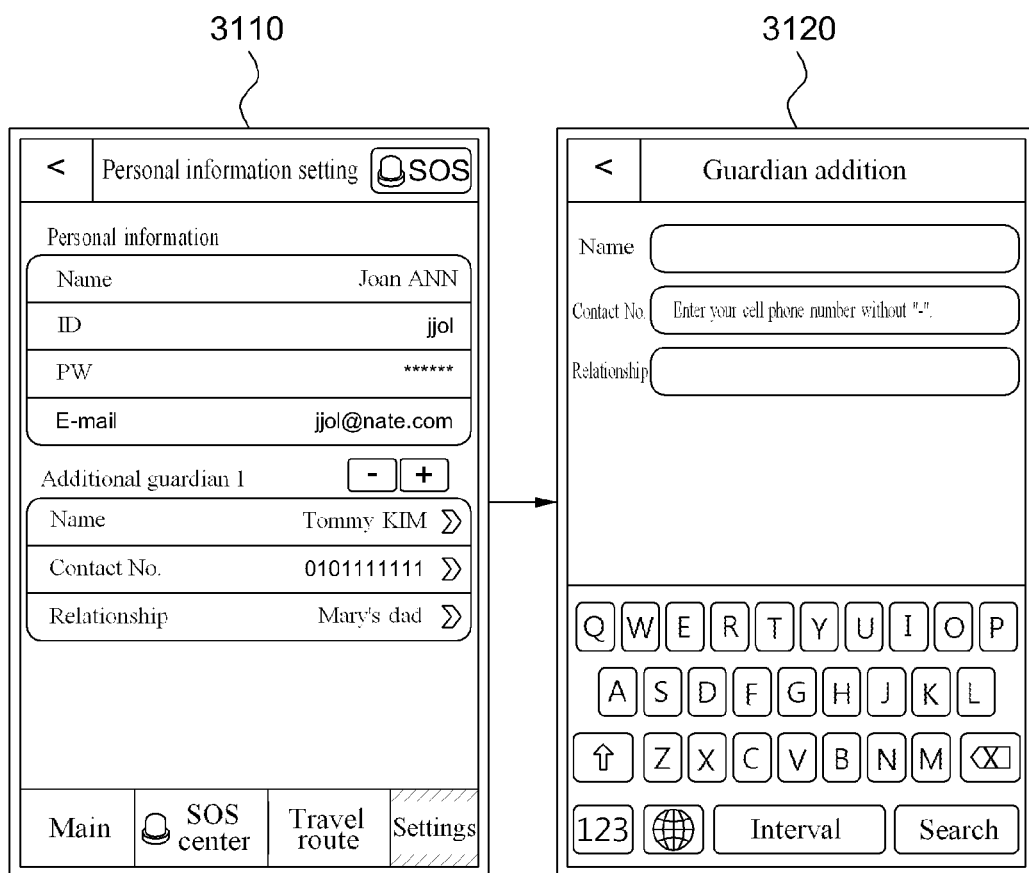

In response to a guardian tapping the personal information setting function 2714 of setting personal information of the guardian on the setting screen 2710 of FIG. 27, the setting screen 2710 may be switched to a personal information setting screen 3110 of FIG. 31 for entering personal information of the guardian. Here, the personal information setting screen 3110 may provide a function of displaying personal information, for example, a name, an ID/PW, and an email address of a guardian, for example, a mother, registered to a safety service system, and a function of registering an additional guardian, for example, a father in addition to the guardian. In response to the guardian tapping the function of registering an additional guardian on the personal information setting screen 3110, the personal information setting screen 3110 may be switched to a guardian adding screen 3120 including an input window for entering a name and a contact number of the additional guardian and a relationship between the guardian and the additional guardian, and a keyboard OSD screen. Also, the personal information setting screen 3110 may provide a function of deleting the additional guardian or correcting information of the additional guardian.

—Ward Setting Function

Figure 32:
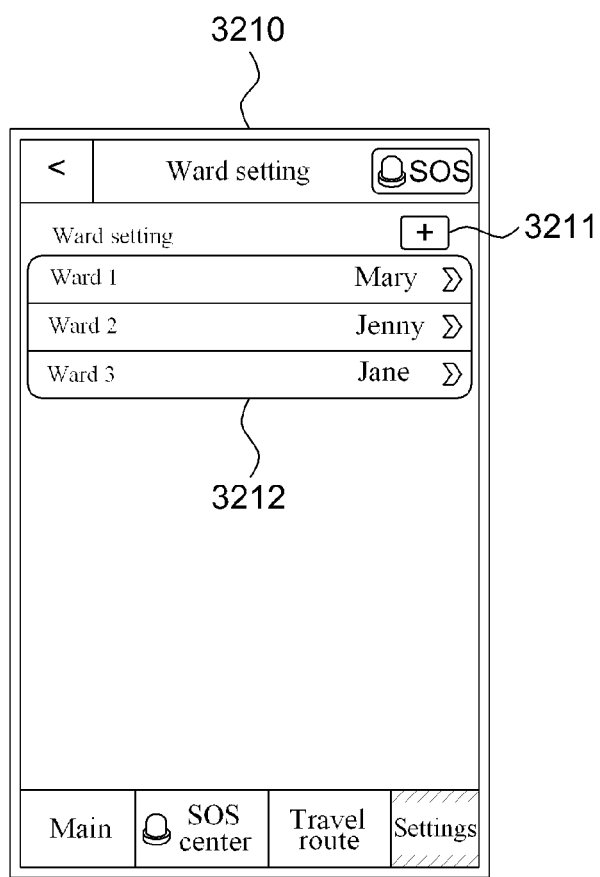
Figure 33:
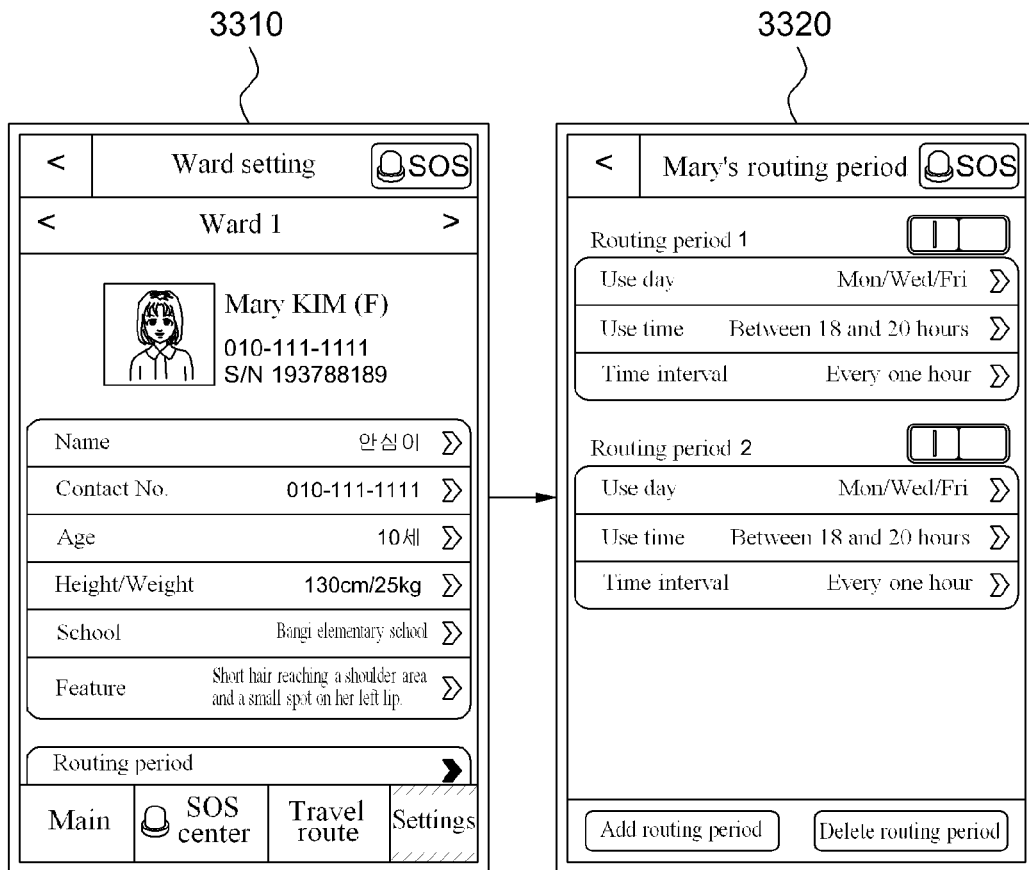

In response to a guardian tapping the ward setting function 2715 of setting a ward on the setting screen 2710 of FIG. 27, the setting screen 2710 may be switched to a ward setting screen 3210 of FIG. 32 for setting a ward. Here, the ward setting screen 3210 may provide an environment in which the guardian may add a plurality of wards or change a ward. The ward setting screen 3210 may provide a function 3211 of adding a ward and a function 3212 of displaying a list of registered wards. In response to the guardian tapping the function 3211 of adding a ward on the ward setting screen 3210, the ward setting screen 3210 may be switched to a service screen associated with a function of authenticating a ward terminal and a function of registering ward information. Here, the terminal authentication screen 620 of FIG. 6 may be provided as the service screen associated with the function of authenticating the ward terminal. Also, a ward registration screen 3310 of FIG. 33 that is functionally similar to the ward registration screen 720 of FIG. 7 may be provided as the service screen associated with the function of registering ward information. That is, the guardian may perform a procedure of authenticating a ward terminal through the terminal authentication screen 620 with respect to a ward desired to be added and then may register a photo, a name, a contact number, a sex, an age, a height/weight, a school, a feature or a decryption, a routing period, and the like, of the ward through the ward registration screen 3310. In particular, in response to the guardian tapping a function of setting a routing period on the ward registration screen 3310, the ward registration screen 3310 may be switched to a routing period setting screen 3320 for setting a routing period of the ward. Here, using the routing period setting screen 3320, it is possible to set a plurality of routing periods with respect to a single ward and to set a use day, a use time, and a time interval as time information in which location information and image information on the ward is allowed to be collected. Also, the routing period setting screen 3320 may provide a function of displaying a list of routing periods set with respect to a predetermined ward, a function of deleting or editing a routing period included in the list of routing periods, and a function of adding a new routing period.

—MY Note Box

Figure 34:
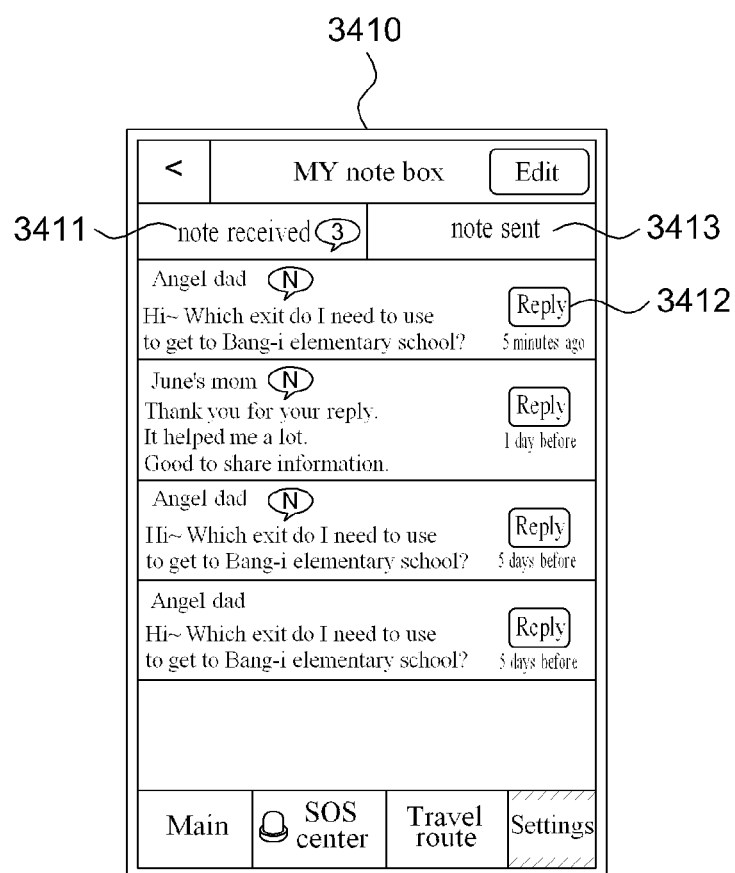

In response to a guardian tapping the MY note box function 2716 of managing a note on the setting screen 2710 of FIG. 27, the setting screen 2710 may be switched to a MY note box screen 3410 of FIG. 34 for managing a note exchanged with another person. The presence/absence of a new note received on the MY note box function 2716 or a number of notes received on the MY note box function 2716 may be displayed on the setting screen 2710 of FIG. 27. The MY note box screen 3410 may provide a function 3411 of displaying a list of notes received from other persons in a received order, a reply function 3412 of sending a reply to another person having sent a note, and a function 3413 of displaying a list of notes sent to other persons in a sent order. Here, the function 3411 of displaying a list of received notes may disclose a name of another person having sent a note of each item and partial content of the note on a list of notes. Also, the function 3411 of displaying a list of received notes and the function 3413 of displaying a list of sent notes may provide a function of selectively deleting a note or deleting all the notes. In response to the guardian tapping the reply function 3412, the MY note box screen 3410 may be switched to a reply screen including an input window for entering a reply and a keyboard OSD screen.

In addition to the function of setting various types of environments associated with the guardian, the aforementioned setting function may provide a function of enabling the guardian to access a notice associated with a safety service, a use guide, a current service use state of the guardian, and the like.

As described above, a safety service system may manage the overall process of a safety service in which a guardian may constantly monitor and manage a location of a ward based on a location and an image of the ward collected from a ward terminal, and may make an SOS dispatch call in response to an occurrence of a danger to the ward. Accordingly, a process and a user interface for a safety service request may be configured in a guardian terminal. Through this, it is possible to display service screens provided from the safety service system.

Figure 35:
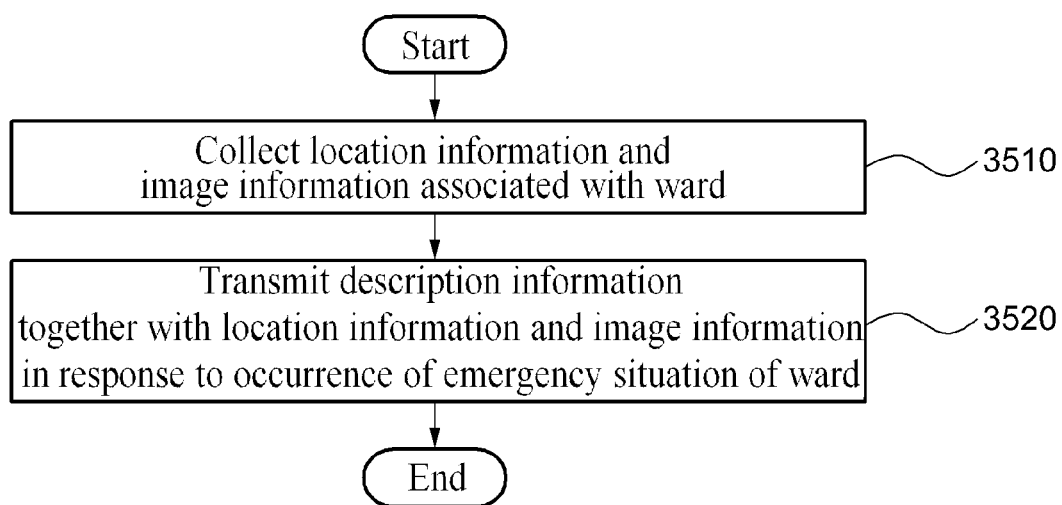
FIG. 35 is a flowchart illustrating a safety service method for providing a safety service that supports monitoring and management of a ward according to an embodiment of the present invention.

FIG. 35 is a flowchart illustrating a safety service method for providing a safety service that supports monitoring and management of a ward according to an embodiment of the present invention. Each operation of the safety service method according to the present embodiment may be performed by the safety service system 300 of FIG. 3.

In operation 3510, the safety service system 300 may collect location information and image information associated with a ward with respect to the ward registered by a guardian. Here, in interaction with a ward terminal, the safety service system 300 may receive, from a ward terminal as necessary and at predetermined intervals, location information indicating a current location of the ward and image information in which a peripheral image of the ward is captured. The ward terminal may refer to a communication terminal having a function of calculating a location of the ward and a function of capturing a peripheral image of the ward and thus, may provide location information and image information of the ward in response to a request of the safety service system 300. Also, when an alert signal is input from the ward or when a level of external impact exceeds a threshold, the ward terminal may detect the alert signal or the external impact as an abnormal signal associated with the ward and thereby provide the location information and the image information to the safety service system 300. Here, the location information may refer to information calculated using at least one of a GPS measurement method and a mobile communication base station measurement method, and the image information may refer to at least one of at least one photo captured at predetermined time intervals and a moving picture taken during a predetermined period of time.

In operation 3520, the safety service system 300 may provide an LBS based safety service based on location information and image information of the ward that is collected from the ward terminal. That is, the safety service system 300 may provide location information and image information of the ward to the guardian in response to a request for referring to the ward from the guardian, and may provide the location information and the image information to the guardian or a security company in response to an alert signal detected with respect to the ward. Here, the safety service system 300 may recognize, as the alert signal associated with the ward, at least one of a case in which an abnormal signal occurs in a ward terminal, for example, a case in which the ward directly inputs the alert signal or a case in which an abnormal signal is detected due to a level of impact exceeding a threshold, a case in which the location information is deviated from a safety zone set by the guardian, and a case in which the location information enters a danger zone set by the guardian. The guardian may verify an emergency situation of the ward based on the location information and the image information provided from the safety service system 300, and if necessary, may request the security company for an SOS dispatch. Accordingly, the safety service system 300 may transfer location information and image information of the ward to the security company and the security company may directly move to a corresponding location and thereby prevent and cope with an emergency situation of the ward. In addition, the safety service system 300 may receive, from the guardian, ward information, such as a photo, personal information, and description information of the ward, and maintain the received ward information. When transmitting location information and image information of the ward to the security company while maintaining the ward information, the safety service system 300 may also provide the ward information registered by the guardian. Here, the ward information including the description information may be provided to the security company together with a location and an image of the ward in response to an occurrence of a danger to the ward and thereby be used as useful information for handling the danger to the ward. Also, the safety service system 300 may provide a memo function of enabling the guardian to input predetermined comments on a location of the ward. That is, the safety service system 300 may receive a memo associated with location information of the ward from the guardian and may store and maintain the received memo. In addition, the safety service system 300 may service a memo of another person to be shared based on location information between guardians having allowed their memos to be disclosed based on an SNS. In response to a request of the guardian, the safety service system 300 may accumulate location information of the ward and may provide a travel route that is a trace along which the ward has moved. The safety service system 300 may provide a service screen associated with a safety service to a guardian terminal connected to the safety service system 300. Here, through the service screen, the safety service system 300 may support a function of registering or editing information associated with the guardian and the ward, a function of referring to a location of the ward, a function of requesting an SOS dispatch based on a level of an emergency situation which the ward has encountered, a function of providing a travel route of the ward, a function of sharing information between guardians, an environment setting function of setting an environment of the safety service, and the like. Here, the function of referring to a location of the ward may include a detailed function about a current location of the ward based on location information and image information of the ward together with a map page on which the current location of the ward is marked on a center of a map. The detailed function may be, for example, a function of playing image information of the ward, a function of providing a name search based on a map search, a function of providing safety information based on a current location of the ward, a function of providing a route guide service about the current location of the ward, a function of changing the current location of the ward, a function of creating and registering a memo associated with the current location of the ward. Also, the function of requesting an SOS dispatch may provide a function of showing a latest location and a current state, for example, a safety zone, a danger zone, and an emergency, of the ward, and may also providing a function of displaying the current location of the ward on a map page, a function of playing image information of the ward, a function of making an SOS dispatch call to a security company with respect to the corresponding ward, a function of displaying details of the SOS dispatch call made with respect to the ward, a function of displaying details of a dispatch taken by the security company in response to an SOS dispatch signal call, and the like. Also, an environment setting function of setting an environment about a safety service may provide a function of setting a ward, a function of setting a safety zone and a danger zone with respect to the ward, a function of registering or editing description information of the ward, a function of setting a type of a map type displayed on a service screen, a function of setting personal information of a guardian, and the like.

As described above, according to example embodiments of the present invention, an environment in which it is possible to constantly monitor and manage a ward may be supported and thus, it is possible to more readily verifying an emergency situation of the ward and to quickly cope with the emergency situation. In addition, according to embodiments of the present invention, by transmitting a location and an image of a ward to a guardian or a security company in response to an occurrence of a danger to the ward, an emergency situation of the ward may be easily verified. Also, according to embodiments of the present invention, by further transmitting a description of a ward in addition to a location of the ward and an image of the ward in response to an occurrence of a danger to the ward, more useful information may be provided. Also, according to embodiments of the present invention, by sharing information between guardians to monitor and manage wards, it is possible to provide an SNS.

Although a few embodiments of the present invention have been shown and described, the present invention is not limited to the described embodiments and those skilled in the art may make various changes and modifications from the description.

Accordingly, the scope of the present invention is not limited to the described embodiments and is defined by the claims and their equivalents.

What is claimed is:

1. An electronic device for providing a service comprising:
a memory configured to store instructions; and
a processor configured to execute the instructions stored in the memory to:
determine whether the electronic device is registered for a service system when an application is used on the electronic device;
provide a user interface associated with the service based on the determination that the electronic device is registered and logged-in to the service system;
receive a request for starting the service from a target electronic device;
receive information on a first location of the target electronic device, the first location being determined by changing a current location of the target electronic device to the first location, the current location being calculated automatically by the target electronic device as a default;
based on user's selection of a visual object associated with requesting for a route guidance service on the user interface of the electronic device, receive a request for the route guidance service;
display a recommended route from a second location of the electronic device to the first location; and
display a guidance for the recommended route to the electronic device.

2. The electronic device of claim 1, wherein the processor further configured to execute the instructions to:
transmit a predetermined comment to the service system.

3. The electronic device of claim 2, wherein the processor further configured to execute the instructions to:
display the predetermined comment in a memo form.

4. The electronic device of claim 3,
wherein the memo form includes a text box to type at least one text or input at least one message, and an on-screen keyboard within the user interface, and
wherein the predetermined comment or the at least one message or the at least one text is transmitted to a designated user's electronic device.

5. The electronic device of claim 1, wherein the processor further configured to execute the instructions to:
receive user's selection of a visual object associated with requesting for an SOS dispatch on the user interface of the electronic device; and
transmit an emergency support request for the SOS dispatch.

6. The electronic device of claim 1, wherein the processor further configured to execute the instructions to:
replace an image associated with the electronic device with another image pre-stored in or captured by the electronic device, in response to a request from the electronic device.

7. The electronic device of claim 1, wherein the processor further configured to execute the instructions to:
display a menu for connecting to the service system if a predetermined condition associated with the target electronic device occurs based on the first location of the target electronic device.

8. A method for providing a service comprising:
determining whether an electronic device is registered for a service system when an application is used on the electronic device;
providing a user interface associated with the service based on the determination that the electronic device is registered and logged-in to the service system;
receiving a request for starting the service from a target electronic device;
receiving information on a first location of the target electronic device, the first location being determined by changing a current location of the target electronic device to the first location, the current location being calculated automatically by the target electronic device as a default;
based on user's selection of a visual object associated with requesting for a route guidance service on the user interface of the electronic device, receiving a request for the route guidance service;
displaying a recommended route from a second location of the electronic device to the first location; and
displaying a guidance for the recommended route to the electronic device.

9. The method of claim 8, further comprising:
transmitting a predetermined comment to the service system.

10. The method of claim 9, further comprising:
displaying the predetermined comment in a memo form.

11. The method of claim 10,
wherein the predetermined comment is input in text box or at least one message by on-screen keyboard in a memo form, and
wherein the input at least one text and the at least one message is transmitted to a designated user's electronic device.

12. The method of claim 8, further comprising:
receiving user's selection of a visual object associated with requesting for an SOS dispatch on the user interface of the electronic device; and
transmitting an emergency support request for the SOS dispatch.

13. The method of claim 8, further comprising:
replacing an image associated with the electronic device with another image pre-stored in or captured by the electronic device, in response to a request from the electronic device.

14. The method of claim 8, further comprising:
displaying a menu for connecting to the service system if a predetermined condition associated with the target electronic device occurs based on the first location of the target electronic device.

15. A method for providing a service comprising:
determining whether an electronic device is registered for a service system when an application is used on the electronic device;
receiving a request for starting the service from a target electronic device based on the determination that the electronic device is registered and logged-in to the service system;
receiving a request for the target electronic device from the electronic device;
acquiring a first location of the target electronic device, the first location being determined by changing a current location of the target electronic device to the first location, the current location being calculated automatically by the target electronic device as a default;
based on user's selection of a visual object associated with requesting for a route guidance service on the user interface of the electronic device, receiving a request for the route guidance service;
calculating a route from a second location of the electronic device to the first location of the target electronic device;

providing the calculated route to the electronic device to be displayed on a map of the electronic device; and providing a guidance for the calculated route to the electronic device.

16. The method of claim 15, further comprising:
transmitting a predetermined comment to the service system.

17. The method of claim 16, further comprising:
displaying the predetermined comment in a memo form.

18. The method of claim 17,
wherein the predetermined comment is input in text box or at least one message by on-screen keyboard in a memo form, and wherein the input at least one text and the at least one message is transmitted to a designated user's electronic device.

19. The method of claim 15, further comprising:
receiving user's selection of a visual object associated with requesting for an SOS dispatch on the user interface of the electronic device; and transmitting an emergency support request for the SOS dispatch.

20. The method of claim 15, further comprising:
replacing an image associated with the electronic device with another image pre-stored in or captured by the electronic device, in response to a request from the electronic device.

\* \* \* \* \*